(12) United States Patent
Rockwood

(10) Patent No.: US 7,950,058 B1
(45) Date of Patent: May 24, 2011

(54) SYSTEM AND METHOD FOR COLLABORATIVE INFORMATION SECURITY CORRELATION IN LOW BANDWIDTH ENVIRONMENTS

(75) Inventor: Troy Dean Rockwood, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 1540 days.

(21) Appl. No.: 11/219,291

(22) Filed: Sep. 1, 2005

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |

(52) U.S. Cl. ......................................................... 726/23
(58) Field of Classification Search .............. 726/11–13, 726/22–23, 25; 340/521–522, 546, 945, 340/961; 345/440
See application file for complete search history.

(56) References Cited

U.S. PATENT DOCUMENTS

| | | | | |
|---|---|---|---|---|
| 5,020,411 | A | 6/1991 | Rowan | 89/1.11 |
| 5,341,229 | A | 8/1994 | Rowan | 359/10 |
| 5,432,871 | A * | 7/1995 | Novik | 382/232 |
| 5,790,599 | A | 8/1998 | Wright, Jr. et al. | |
| 5,805,801 | A | 9/1998 | Holloway et al. | 395/187.01 |
| 5,991,881 | A | 11/1999 | Conklin et al. | 726/22 |
| 6,088,804 | A * | 7/2000 | Hill et al. | 726/25 |
| 6,226,589 | B1 | 5/2001 | Maeda et al. | 701/207 |
| 6,253,337 | B1 | 6/2001 | Maloney et al. | 714/38 |
| 6,327,550 | B1 * | 12/2001 | Vinberg et al. | 702/186 |
| 6,341,298 | B1 | 1/2002 | Ilani | |
| 6,347,263 | B1 * | 2/2002 | Johnson et al. | 701/14 |
| 6,404,380 | B2 | 6/2002 | Poore, Jr. | 342/96 |
| 6,408,297 | B1 | 6/2002 | Ohashi | 707/10 |
| 6,421,467 | B1 | 7/2002 | Mitra | |
| 6,574,378 | B1 | 6/2003 | Lim | |
| 6,633,882 | B1 | 10/2003 | Fayyad et al. | |
| 6,650,779 | B2 | 11/2003 | Vachtesvanos et al. | |
| 6,665,715 | B1 | 12/2003 | Houri | 709/223 |
| 6,674,911 | B1 | 1/2004 | Pearlman et al. | |
| 6,744,396 | B2 * | 6/2004 | Stone et al. | 342/36 |
| 6,954,775 | B1 | 10/2005 | Shanklin et al. | 718/105 |
| 7,017,186 | B2 | 3/2006 | Day | |
| 7,058,976 | B1 | 6/2006 | Dark | 726/23 |
| 7,100,204 | B1 | 8/2006 | Myllymaki et al. | |
| 7,127,743 | B1 | 10/2006 | Khanolkar et al. | 726/23 |
| 7,130,611 | B2 | 10/2006 | Kimura et al. | 455/404.2 |
| 7,146,421 | B2 | 12/2006 | Syvanne | 709/226 |
| 7,185,368 | B2 | 2/2007 | Copeland, III | 726/25 |
| 7,251,376 | B2 | 7/2007 | Qian et al. | |
| 7,324,108 | B2 * | 1/2008 | Hild et al. | 345/440 |

(Continued)

OTHER PUBLICATIONS

Ma et al., Event Miner: An integrated mining tool for Scalable Analysis of EVent Data, May 21, 2001, pp. 1-17.*

(Continued)

*Primary Examiner* — Nasser Moazzami
*Assistant Examiner* — Trong Nguyen
(74) *Attorney, Agent, or Firm* — Baker Botts L.L.P.

(57) ABSTRACT

A method for security information management in a network comprises receiving event information for a plurality of events, wherein the event information for a particular event comprises a plurality of attributes associated with that event. The method continues by assigning a plurality of attribute values to each event, the attribute values of each event defining a point in n-dimensional space. The method continues by generating a first n-dimensional graph comprising a plurality of points, the points corresponding to the events. The method continues by receiving a second n-dimensional graph comprising a plurality of points. The method concludes by combining the first n-dimensional graph with the second n-dimensional graph.

34 Claims, 7 Drawing Sheets

U.S. PATENT DOCUMENTS

| | | | |
|---|---|---|---|
| 7,370,358 B2 * | 5/2008 | Ghanea-Hercock | 726/23 |
| 2002/0059164 A1 | 5/2002 | Shtivelman | 707/1 |
| 2002/0078381 A1 * | 6/2002 | Farley et al. | 713/201 |
| 2002/0112189 A1 | 8/2002 | Syvanne et al. | 713/201 |
| 2002/0165842 A1 | 11/2002 | Hellerstein et al. | 706/47 |
| 2002/0188618 A1 * | 12/2002 | Ma et al. | 707/102 |
| 2003/0009699 A1 * | 1/2003 | Gupta et al. | 713/201 |
| 2003/0023876 A1 | 1/2003 | Bardsley et al. | 713/201 |
| 2003/0058339 A1 * | 3/2003 | Trajkovic et al. | 348/155 |
| 2003/0105976 A1 | 6/2003 | Copeland, III | 713/201 |
| 2003/0145226 A1 | 7/2003 | Bruton et al. | 726/22 |
| 2003/0154399 A1 | 8/2003 | Zuk et al. | 726/11 |
| 2003/0177383 A1 | 9/2003 | Ofek et al. | 726/14 |
| 2003/0188189 A1 | 10/2003 | Desai et al. | 713/201 |
| 2003/0200236 A1 | 10/2003 | Hong | |
| 2003/0217289 A1 * | 11/2003 | Ammon et al. | 713/201 |
| 2004/0015719 A1 | 1/2004 | Lee et al. | 726/23 |
| 2004/0024855 A1 | 2/2004 | Tsai et al. | 709/223 |
| 2004/0025044 A1 | 2/2004 | Day | |
| 2004/0044912 A1 | 3/2004 | Connary et al. | 713/201 |
| 2004/0049698 A1 | 3/2004 | Ott et al. | 713/201 |
| 2004/0098623 A1 | 5/2004 | Scheidell | 713/201 |
| 2004/0103211 A1 * | 5/2004 | Jackson et al. | 709/244 |
| 2004/0107125 A1 | 6/2004 | Guheen et al. | 705/7 |
| 2004/0117407 A1 | 6/2004 | Kumar et al. | 707/200 |
| 2004/0117654 A1 | 6/2004 | Feldman et al. | |
| 2004/0133543 A1 | 7/2004 | Shlaes et al. | 707/1 |
| 2004/0172557 A1 | 9/2004 | Nakae et al. | 726/22 |
| 2004/0193943 A1 | 9/2004 | Angelino et al. | 714/4 |
| 2004/0215977 A1 | 10/2004 | Goodman et al. | |
| 2004/0260945 A1 | 12/2004 | Raikar et al. | 713/201 |
| 2004/0261116 A1 | 12/2004 | Mckeown et al. | 725/109 |
| 2004/0267886 A1 | 12/2004 | Malik | |
| 2005/0035965 A1 | 2/2005 | Sloan et al. | 345/426 |
| 2005/0044406 A1 | 2/2005 | Stute | 713/201 |
| 2005/0047670 A1 | 3/2005 | Qian et al. | |
| 2005/0108518 A1 | 5/2005 | Pandya | 713/151 |
| 2005/0138110 A1 | 6/2005 | Redlich et al. | 709/201 |
| 2005/0222996 A1 | 10/2005 | Yalamanchi | 707/4 |
| 2005/0254654 A1 | 11/2005 | Rockwell et al. | 380/270 |
| 2006/0010493 A1 | 1/2006 | Piesco et al. | 726/23 |
| 2006/0031934 A1 | 2/2006 | Kriegel | 726/22 |
| 2006/0130070 A1 | 6/2006 | Graf | 719/318 |
| 2006/0209836 A1 | 9/2006 | Ke et al. | 370/392 |
| 2006/0253905 A1 | 11/2006 | Mansel | 726/23 |
| 2006/0253907 A1 | 11/2006 | McConnell | 726/23 |
| 2007/0009160 A1 | 1/2007 | Loo et al. | |

OTHER PUBLICATIONS

Noel et al., Correlating Inrusion Events and Building Attack Scenarios Through Attack Graph Distances, 2004, Computer Security Applications Conferences, 2004, 20th Annual, pp. 1-5.*

U.S. Appl. No. 10/407,513, entitled "*Vertically Extensible Intrusion Detection System and Method*", inventors Jon-Michael C. Brook, et al., 44 pages plus 7 pages of drawings, filed Apr. 4, 2003.

U.S. Appl. No. 10/407,700, entitled "*Dynamic Rule Generation for an Enterprise Intrusion Detection System*", inventors Jon-Michael C. Brook, et al., 38 pages plus 7 pages of drawings, filed Apr. 4, 2003.

U.S. Appl. No. 10/407,030, entitled "*Graphical User Interface for an Enterprise Intrusion Detection System*", inventors Jon-Michael C. Brook, et al., 34 pages plus 7 pages of drawings, filed Apr. 4, 2003.

Patent Pending Application (serial No. not yet assigned), entitled "*System and Method for Active Data Collection in a Network Security System*", inventor Troy D. Rockwood, 23 pages plus 2 pages of drawings, filed Jul. 6, 2005.

New Patent Application (serial No. not yet assigned), entitled "*System and Method for Interactive Correlation Rule Design in a Network Security System*", inventor Troy D. Rockwood, 31 pages plus 4 pages of drawings, filed Sep. 1, 2005.

New Patent Application (serial No. not yet assigned), entitled "*System and Method for Intruder Tracking Using Advanced Correlation in a Network Security System*", inventor Troy D. Rockwood, 43 pages plus 7 pages of drawings, filed Sep. 1, 2005.

Li et al., "Multi-Tier Intrusion Detection System," pp. 1-11.

Commonwealth of Australia, "Handbook 13, Intrusion Detection and Audit Analysis, v. 1.0," Australian Communications-Electronic Security Instruction 33 (ACSI 33), pp. 13:1-13.

Wu et al., "JiNao: Design and Implementation of a Scalable Intrusion Detection System for the OSPF Routing Protocol," pp. 0-23, Feb. 24, 1999.

Dasgupta; "Experiments with Random Projection," Proc. 16th Conference Uncertainty in Artificial Intelligence (UAI), 9 pages, 2000.

Cisco Systems, Inc., "NetRanger User Guide 2.2.1," Chapters 1-9 and Appendices A-C 2000.

Jou et al., "Design and Implementation of a Scalable Intrusion Detection System for the Protection of Network Infrastructure," DARPA Information Survivability Conference and Exposition (DISCEX), 15 pages, Jan. 2000.

Boeckman, "Getting Closer to Policy-Based Intrusion Detection," Information Security Bulletin, pp. 13-20, May 2000.

Jansen et al., "Mobile Agents in Intrusion Detection and Response," National Institute for Standards and Technology, 12 pages, Jun. 2000.

Northcutt et al., "Network Intrusion Detection: An Analyst's Handbook," $2^{nd}$ Ed., 19 pages, Sep. 2000.

Phung, "Intrusion Detection FAQ; Data Mining in Intrusion Detection," SANS.org, 3 pages, Oct. 24, 2000.

Power, "CSI Roundtable: Experts Discuss Present and Future Intrusion Detection Systems," Computer Security Journal vol. XIV, #1, 15 pages, 2001.

Bace et al., "Intrusion Detection Systems," NIST Special Publication on Intrusion Detection System, 51 pages, Feb. 2001.

"Stick—A Potential Denial of Service Against IDS Systems," Internet Security Systems Security Alert, 2 pages, Mar. 14, 2001.

Arnold, "Kernel Based Anomaly Detection," Intrusion Detection Systems, Machine Learning Group, Columbia University, 2 pages, Apr. 26, 2001.

Wang et al., "SITAR: A Scalable Intrusion-Tolerant Architecture for Distributed Services," IEEE Workshop on Information Assurance and Security, pp. 38-45, Jun. 5-6, 2001.

Intrusion.com, Inc., "Network Intrusion Detection System," SecureNet Series, 6 pages, Jul. 2001.

Raghudharan, "Intrusion Detection Systems: Beyond the first line of defense," Network Magazine, 7 pages, Sep. 2001.

Yocom et al., "Intrusion Detection Products Grow Up," Network World, pp. 1-10/12, Oct. 8, 2001.

Symantec, "Symantec™ ManHunt: Reducing the Risk of Compromise," Enterprise Security Technology, 4 pages, 2002.

ISS Corporation, "ISS RealSecure© Protection System," 5 pages, Apr. 1, 2003.

Curry et al., "Intrusion Detection Message Exchange Format Data Model and Extensible Markup Language (XML) Document Type Definition," Intrusion Detection Working Group, 116 pages, Jan. 30, 2003.

Jiang et al., "Compressing *N*-Dimensional Data", U.S. Appl. No. 11/559,786, 31 pages, 3 pages of drawings, filed Nov. 14, 2006.

Gersho et al., "Vector Quantization and Signal Compression," Kluwar Academic Publishers, 737 pages, 1992.

Henry S. Teng, et al.; *Security Audit Trail Analysis Using Inductively Generated Predictive Rules*; IEEE; CH2842-3/90/0000/0024; pp. 24-29, 1990.

*IEEE Xplore Release 2.5 Search Results*; 4 pages retrieved Jan. 6, 2009.

*USPTO; Office Action* for U.S. Appl. No. 11/219,025, filed Sep. 1, 2005 in the name of Troy Dean Rockwood; 16 pages, Jan. 15, 2009.

*USPTO; Office Action* for U.S. Appl. No. 11/176,436, filed Jul. 6, 2005 in the name of Troy Dean Rockwood; 29 pages, Feb. 10, 2009.

N. Hari Narayanan, et al.; *A Methodology for Knowledge Acquisition and Reasoning in Failure Analysis of Systems*; IEEE Transactions on Systems, Man, and Cybernetics; vol. SMC-17, No. 2; pp. 274-288, 1987.

Henry S. Vaccaro; *Detection of Anomalous Computer Session Activity*; IEEE Symposium on Research in Security and Privacy; 24 pages, May 1989.

Henry S. Teng, et al.; *Adaptive Real-Time Anomaly Detection Using Inductively Generated Sequential Patterns*; IEEE; CH2884-5/90/0000/0278; pp. 278-284, 1990.

Keith C. C. Chan, et al.; *Learning Sequential Patterns for Probabilistic Inductive Prediction*; IEEE Transactions on Systems, Man, and Cybernetics; vol. 24, No. 10; 16 pages, Oct. 1994.

F. Girault, et al.; *Linear Logic as a Tool for Reasoning on a Petri Net Model*; IEEE Symposium on Emerging Technologies and Factory Automation; 11 pages, Oct. 1995.

P. Nassery, et al.; *Real Time Seismic Signal Processing Using the ARMA Model Coefficients and an Intelligent Monitoring System*; IEEE TENCON—Speech and Image Technologies for Computing and Telecommunications; pp. 807-810, 1997.

Moataz A. Ahmed, et al.; *Rule-Based Information Distribution Systems: Near-Optimal Rule Sets Generation*; IEEE; 0-7803-4778-1; pp. 1564-1569, 1998.

P. Lang, et al.; *A Graphical Editor for the Conceptual Design of Business Rules*; 1 page, Feb. 1998.

Alistair G. Sutcliffe, et al.; *Supporting Scenario-Based Requirements Engineering*; IEEE Transactions on Software Engineering; vol. 24, No. 12; pp. 1072-1088, Dec. 1998.

Adrian K. Rantilla, et al.; *Aggregation of Expert Opinions*; Proceedings of the 32nd Hawaii International Conference on System Sciences; IEEE 0/7695-0001-3/99; pp. 1-11, 1999.

Slavica Jonic, et al.; *Three Machine Learning Techniques for Automatic Determination of Rules to Control Locomotion*; IEEE Transactions on Biomedical Engineering; vol. 46, No. 3; pp. 300-310. Mar. 1999.

Ian Ho, et al.; *Generating Test Cases for Real-Time Software by Time Petri Nets Model*; Proceedings Eighth Asian Test Symposium; 7 pages, Nov. 1999.

Virtyt Koshi; *Radio Network Planning for Ultra TDD Systems*; First International Conference on 3G Mobile Communication Technologies; 7 pages, Mar. 2000.

Ilham Benyahia, et al.; *An Adaptive Framework for Distributed Complex Applications Development*; Proceedings 34th International Conference on Technology of Object-Oriented Languages and Systems; 12 pages, Jul. 2000.

Tae-Sic Yoo, et al.; *New Results on Decentralized Supervisory Control of Discrete-Event Systems*; 6 pages, Dec. 2000.

Ping-Peng Yuan, et al.; *An Event and Service Interacting Model and Event Detection Based on the Broker/Service Model*; pp. 20-24, Jul. 2001.

W. E. Brown, et al.; *Estimation of Ocean Bottom Scattering Strength Using Discrete Eigenray Matching in Shallow Water*; MTS 0-933-957-28-9; pps. 1636-1639, Nov. 2001.

XiaoShu Hang, et al.; *A FSA-Based Approach for Mining Sequential Patterns with User-Specified Skeletons*; Proceedings of the 4th World Congress on Intelligent Control and Automation; 6 pages, Jun. 2002.

Azizi Ab Aziz, et al.; *Development of an Adaptive Business Insolvency Classifier Prototype (AVICENA) Using Hybrid Intelligent Algorithms*; Proceedings Globalizing Research and Development in Electrical and Electronics Engineering; 5 pages, Jul. 2002.

Loganathan Lingappan, et al.; *Test Generation for Non-Separable RTL Controller-Datapath Circuits Using a Satisfiability Based Approach*; Proceedings of the 21st International Conference on Computer Design; 7 pages, 2003.

F. Y. Nakamoto, et al.; *Systematization of the Project of the Production System Control*; IEEE International Symposium on Industrial Electronics; 8 pages, Jun. 2003.

Nicholas Pioch, et al.; *CADRE: Continuous Analysis and Discovery From Relational Evidence*; International Conference on Integration of Knowledge Intensive Multi-Agent Systems; 9 pages, Sep. 2003.

Andrew Hamilton-Wright, et al.; *Constructing a Fuzzy Rule Based Classification System Using Pattern Discovery*; NAFIPS 2005—2005 Annual Meeting of the North American Fuzzy Information Processing Society; pp. 460-465, 2005.

USPTO; *Office Action* for U.S. Appl. No. 10/407,700, filed Apr. 4, 2003 in the name of Jon-Michael C. Brook; 10 pages, Aug. 9, 2006.

USPTO; *Office Action* for U.S. Appl. No. 10/407,030, filed Apr. 4, 2003 in the name of Jon-Michael C. Brook; 9 pages, Jan. 8, 2007.

USPTO; *Office Action* for U.S. Appl. No. 10/407,513, filed Apr. 4, 2003 in the name of Jon-Michael C. Brook; 12 pages, Mar. 27, 2007.

USPTO; *Office Action* for U.S. Appl. No. 10/407,700, filed Apr. 4, 2003 in the name of Jon-Michael C. Brook; 9 pages, Apr. 19, 2007.

USPTO; *Office Action* for U.S. Appl. No. 11/219,595, filed Sep. 1, 2005 in the name of Troy Dean Rockwood; 17 pages, Jun. 7, 2007.

USPTO; *Advisory Action* for U.S. Appl. No. 10/407,700, filed Apr. 4, 2003 in the name of Jon-Michael C. Brook; 3 pages, Jul. 6, 2007.

USPTO; *Notice of Allowance and Fee(s) Due* for U.S. Appl. No. 10/407,030, filed Apr. 4, 2003 in the name of Jon-Michael C. Brook; 15 pages, Aug. 24, 2007.

USPTO; *Notice of Allowance and Fee(s) Due* for U.S. Appl. No. 10/407,513, filed Apr. 4, 2003 in the name of Jon-Michael C. Brook. 17 pages, Nov. 6, 2007.

USPTO; *Notice of Allowance and Fee(s) Due* for U.S. Appl. No. 11/219,595, filed Sep. 1, 2005 in the name of Troy Dean Rockwood; 6 pages Nov. 7, 2007.

USPTO; *Office Action* for U.S. Appl. No. 11/219,025, filed Sep. 1, 2005 in the name of Troy Dean Rockwood; 11 pages, Mar. 24, 2008.

USPTO; *Office Action* for U.S. Appl. No. 11/219,025, filed Sep. 1, 2005 in the name of Troy Dean Rockwood; 12 pages, Sep. 10, 2008.

USPTO; *Advisory Action* for U.S. Appl. No. 11/219,025, filed Sep. 1, 2005 in the name of Troy Dean Rockwood; 3 pages, Nov. 20, 2008.

USPTO; *Office Action* for U.S. Appl. No. 10/407,700, filed Apr. 4, 2003 in the name of Jon-Michael C. Brook; 7 pages, Apr. 17, 2009.

Peng Ning, et al.; *Techniques and Tools for Analyzing Intrusion Alerts*; ACM Transactions on Information and System Security; vol. 7, No. 2; 45 pages, May 2004.

Patent Pending U.S. Appl. No. 11/328,689 entitled *System and Method for Attacker Attribution in a Network Security System* in the name of Troy Dean Rockwood; 51 total pages, filed Jan. 10, 2006.

USPTO; *Office Action* for U.S. Appl. No. 11/328,689, filed Jan. 10, 2006 in the name of Troy Dean Rockwood; 18 pages, Mar. 19, 2009.

USPTO; *Office Action* for U.S. Appl. No. 11/219,025, filed Sep. 1, 2005 in the name of Troy Dean Rockwood; 12 pages, Jul. 22, 2009.

Troy Dean, *USPTO, Office Action* for U.S. Appl. No. 11/176,436, filed Jul. 6, 2005, mailed Aug. 7, 2009.

Qin Jiang, *USPTO, Office Action* for U.S. Appl. No. 11/359,786, filed Nov. 14, 2006, mailed Aug. 10, 2009.

Troy Dean, *USPTO, Office Action* for U.S. Appl. No. 11/328,689, filed Jan. 10, 2006, mailed Sep. 10, 2009.

USPTO; *Office Action* for U.S. Appl. No. 11/559,786, filed Nov. 14, 2006 in the name of Qin Jiang; 22 pages Notification Date Jan. 22, 2010.

USPTO; *Office Action* for U.S. Appl. No. 11/219,025, filed Sep. 1, 2005 in the name of Troy Dean Rockwood, 12 pages Notification Date Jan. 5, 2010.

USPTO; *Office Action* for U.S. Appl. No. 11/328,689, filed Jan. 10, 2006 in the name of Troy Dean Rockwood; 25 pages Notification Date Feb. 22, 2010.

Liu et al., "*Incremental Maintenance of Nested Relational Views*", Database Engineering and Applications, 1999, International Symposium Proceedings Aug. 2-4, 1999; pp. 197-205, 1999.

USPTO; *Office Action* for U.S. Appl. No. 11/176,436, filed Jul. 6, 2005 in the name of Troy Dean Rockwood; 20 pages; Mailed Dec. 24, 2009.

USPTO; *Office Action* for U.S. Appl. No. 10/407,700, filed Apr. 4, 2003 in the name of Joh-Michael Brook; 4 pages; Mailed Oct. 16, 2009.

USPTO; *Office Action* for U.S. Appl. No. 10/407,700, filed Apr. 4, 2003 in the name of Jon-Michael C. Brook; 5 pages, Notification Date Apr. 14, 2010.

USPTO; Final Office Action, U.S. Appl. No. 11/219,025, filed Sep. 1, 2005, May 28, 2010, 13 pages.

USPTO; Office Action for U.S. Appl. No. 11/176,436, filed Jul. 6, 2005 in the name of Troy Dean Rockwood; 20 pages; Jun. 3, 2010.

Rockwood, "Advisory Action," U.S. Appl. No. 11/328,689, filed with USPTO Nov. 30, 2009, 2 pages.

USPTO; Advisory Action, U.S. Appl. No. 11/219,025, filed Sep. 1, 2005, Inventor Troy Dean Rockwood; 4 pages, Aug. 4, 2010.

USPTO; Notice of Allowance and Fee(s) Due, U.S. Appl. No. 10/407,700, filed Apr. 4, 2003, Inventor Jon-Michael C. Brook; 9 pages, Oct. 19, 2010.

Rockwood, "Response Pursuant to 37 C.F.R. §1.111," U.S. Appl. No. 11/219,025, 11 pages, filed with USPTO Jun. 24, 2008.

Rockwood, "Response Pursuant to 37 C.F.R. §1.111," U.S. Appl. No. 11/219,025, 16 pages, filed with USPTO Apr. 14, 2009.

Rockwood, "Response Pursuant to 37 C.F.R. §1.111," U.S. Appl. No. 11/176,436, 12 pages, filed with USPTO May 11, 2009.

Rockwood, "Response Pursuant to 37 C.F.R. §1.111," U.S. Appl. No. 11/328,689, 15 pages, filed with USPTO Jun. 19, 2009.

Rockwood, "Response Pursuant to 37 C.F.R. §1.111," U.S. Appl. No. 11/219,025, 11 pages, filed with USPTO Oct. 22, 2009.

Rockwood, "Response Pursuant to 37 C.F.R. §1.116," U.S. Appl. No. 11/176,436, 11 pages, filed with USPTO Oct. 7, 2009.

Rockwood, "Response Pursuant to 37 C.F.R. §1.116," U.S. Appl. No. 11/328,689, 15 pages, filed with USPTO Nov. 9, 2009.

Rockwood, "Response Pursuant to 37 C.F.R. §1.116," U.S. Appl. No. 11/219,025, 12 pages, filed with USPTO Nov. 10, 2008.

Rockwood, "Response Pursuant to 37 C.F.R. §1.111," U.S. Appl. No. 11/176;436, 13 pages, filed with USPTO Mar. 24, 2010.

Rockwood, "Response Pursuant to 37 C.F.R. §1.111," U.S. Appl. No. 11/219,025, 13 pages, filed with USPTO Apr. 5, 2010.

Rockwood, "Response Pursuant to 37 C.F.R. §1.111," U.S. Appl. No. 11/328,689, 17 pages, filed with USPTO May 24, 2010.

Brook et al., "Response Pursuant to 37 C.F.R. §1.111," U.S. Appl. No. 10/407,700, 12 pages, filed with USPTO Jul. 14, 2010.

Brook et al., "Response Pursuant to 37 C.F.R. §1.111," U.S. Appl. No. 10/407,700, 3 pages, filed with USPTO Jan. 19, 2010.

Rockwood, "Response Pursuant to 37 C.F.R. §1.111," U.S. Appl. No. 11/559,786, 13 pages, filed with USPTO Apr. 22, 2010.

Rockwood, "Response Pursuant to 37 C.F.R. §1.111," U.S. Appl. No. 11/559,786, 12 pages, filed with USPTO Nov. 10, 2009.

Rockwood, "Response Pursuant to 37 C.F.R. §1.116," U.S. Appl. No. 11/219,025, 15 pages, filed with USPTO Jul. 28, 2010.

* cited by examiner

| | ATTRIBUTE 410a | ATTRIBUTE 410b | ATTRIBUTE 410c | ATTRIBUTE VALUE 420a | ATTRIBUTE VALUE 420b | ATTRIBUTE VALUE 420c |
|---|---|---|---|---|---|---|
| DETECTED EVENT 110a | 5:25 P.M. | 205.252.48.163 | 192.187.23.220 | 17.42 | 3455856803 | 3233486812 |
| DETECTED EVENT 110b | 2:02 P.M. | 205.252.48.240 | 192.187.23.206 | 14.03 | 3455856880 | 3233486798 |
| DETECTED EVENT 110c | 5:10 P.M. | 205.252.48.168 | 192.187.23.102 | 17.17 | 3455856808 | 3233486694 |
| TARGET EVENT 364 | 5:20 P.M. | 205.252.48.166 | 192.187.23.110 | 17.33 | 3455856806 | 3233486702 |
| PROXIMITY LIMITS 370 | 45 MINUTES | 20 | 30 | 0.75 | 20 | 30 |

SYSTEM AND METHOD FOR COLLABORATIVE INFORMATION SECURITY CORRELATION IN LOW BANDWIDTH ENVIRONMENTS

TECHNICAL FIELD OF THE INVENTION

This invention relates to intrusion detection systems and more specifically to a system and method for collaborative information security correlation in low bandwidth environments.

BACKGROUND OF THE INVENTION

Intrusion detection systems are used by an enterprise to detect and identify unauthorized or unwanted use (commonly called an attack) of the enterprise's computer network, which normally comprises a large number of nodes and network operations centers. In general, these enterprise intrusion detection systems receive data using sensors or other intrusion detection devices. The sensors typically transmit the incoming data via an internal network to a server. The server typically correlates the incoming data according to rules designed to detect specific patterns in network traffic, audit trails, and other data sources to detect attacks on the enterprise's computer network. Intrusion detection systems often receive voluminous amounts of incoming data. Consequently, intrusion detection systems typically require a high bandwidth network connection between the sensors and the server. In addition, intrusion detection systems typically require that the high bandwidth network connection be dedicated primarily to the transmission of intrusion detection system data.

SUMMARY OF THE INVENTION

In accordance with the present invention, the disadvantages and problems associated with traditional information security correlation in low bandwidth environments have been substantially reduced or eliminated.

In one embodiment of the present invention, a method for security information management in a network comprises receiving event information for a plurality of events, wherein the event information for a particular event comprises a plurality of attributes associated with that event. The method continues by assigning a plurality of attribute values to each event, the attribute values of each event defining a point in n-dimensional space. The method continues by generating a first n-dimensional graph comprising a plurality of points, the points corresponding to the events. The method continues by receiving a second n-dimensional graph comprising a plurality of points. The method concludes by combining the first n-dimensional graph with the second n-dimensional graph.

The invention has several important technical advantages. Various embodiments of the invention may have none, some, or all of these advantages. One advantage is that the present invention enables an intrusion detection system to correlate incoming data received by multiple sensors communicatively connected in a low bandwith network. The present invention enables network nodes to compress and transmit data in a low bandwidth network without diminishing the usefulness of the data for detecting attacks on the enterprise. In addition, the present invention reduces the amount of data that the system requires to be transmitted between network nodes. Finally, the present invention enables network nodes to prioritize incoming data to gauge the severity of an attack spread among multiple sensors of the intrusion detection system.

Other technical advantages of the present invention will be readily apparent to one skilled in the art from the description and the appended claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
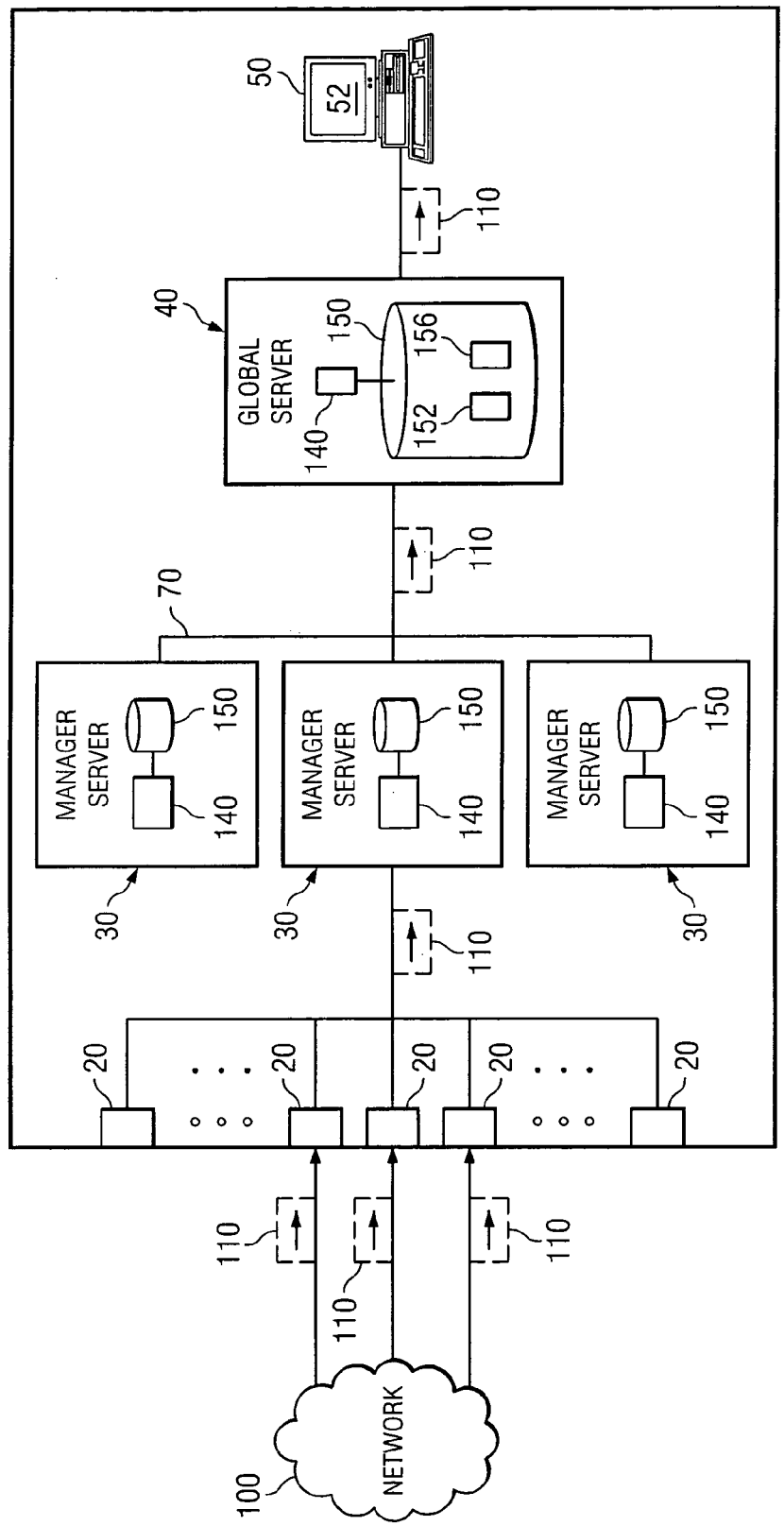
FIG. 1 illustrates an intrusion detection system according to one embodiment of the present invention.

FIG. 1 illustrates an intrusion detection system 10 distributed across an enterprise system according to one embodiment of the present invention. Intrusion detection system 10 comprises a plurality of sensors 20, one or more manager servers 30, global server 40, and console 50. These elements of system 10 may be communicatively coupled using an internal network 70. In general, system 10 performs data collection using sensors 20. The data is correlated by manager servers 30 and/or global server 40 in accordance with rules designed to detect attacks on the enterprise system. By correlating the data with profiles of attackers, system 10 determines the likely identity of attackers of the enterprise system. By identifying attackers, an operator of system 10 is better able to respond to attacks, preempt future attacks, and gather evidence against attackers.

The "enterprise" may comprise any business, government, military, organization, or other entity that has multiple network channels or ports to a network 100. Network 100 may include any suitable portions of an external network and/or an internal network. In this regard, intrusion detection system 10 monitors network communications on both external and internal links. For example, an enterprise may include three ports for external network communications including email, internet, and dialup. In this example, intrusion detection system 10 monitors network communications on the three external ports. Based upon data received in these input streams, system 10 attempts to detect, locate, or block an attack on the enterprise. An "attack" may be any malicious, destructive, or suspicious activity communicated from a source external and/or or internal to the portion of the enterprise protected by system 10. Attacks may include viruses, Trojan horses, worms, or any other piece of code or data that represents at least a portion of an unwanted attempt to access the protected portion of the enterprise.

Internal network 70 may include one or more intranets, local area networks (LANs), metropolitan area networks (MANs), wide area networks (WANs), or any other suitable enterprise network. Internal network 70 may, for example, communicate Internet Protocol (IP) packets, frame relay frames, Asynchronous Transfer Mode (ATM) cells, and/or other suitable messages between network addresses. According to particular embodiments, messages between the levels may be in one or more formats including Intrusion Detection Message Exchange Format (IDMEF), binary format, and/or other appropriate format.

Network 100 represents any network not protected by intrusion detection system 10. Accordingly, network 100 communicably couples system 10 with other computer systems. Network 100 may, for example, communicate Internet Protocol (IP) packets, frame relay frames, Asynchronous Transfer Mode (ATM) cells, and/or other suitable information between network addresses. Network 100 may include one or more intranets, local area networks (LANs), metropolitan area networks (MANs), wide area networks (WANs), all or a portion of the Internet, and/or any other communication system or systems at one or more locations. An external client system (not shown) may be any computer, enterprise or non-enterprise, which is trying to access the portion of internal network 70 protected by intrusion detection system 10. As used in this document, the term "computer" is intended to encompass a personal computer, server, mainframe, terminal, workstation, network computer, kiosk, wireless data port, wireless telephone, personal digital assistant (PDA), one or more processors within these or other devices, or any other suitable processing device.

Each sensor 20 is located at a network port that receives TCP/IP packets or other similar network communications from network 100. These packets and similar network communications received by sensors 20 are referred to as detected events 110. The data that makes up detected events 110 is referred to as event information.

A detected event 110 may be an attack—that is, an unauthorized or unwanted use of the enterprise's computer network. Generally, sensor 20 processes detected events 110 to detect the presence of an attack. Sensor 20 outputs at least detected events 110, and according to certain embodiments, sensor 20 may generate an alert (not shown) upon detecting an attack. Sensor 20 may output the alert as part of a particular detected event 110 or as a distinct message.

Sensor 20 may use any suitable detection technique to process and output detected events 110 and appropriate alerts. For example, sensor 20 may use algorithms, signatures, scripts, or any suitable detection or comparison technique to process packet headers, packet payloads, and/or any other data. Sensor 20 may include any suitable combination of hardware, software, or firmware to receive detected events 110 from sources via network 100, process detected events 110, and communicate detected events 110 and alerts to higher levels. For example, sensor 20 may comprise a computer, server, lower-level intrusion detection system, firewall, or any module written in any appropriate computer language such as, for example, C, C++, Java, Perl, and others. It will be understood that while sensor 20 is illustrated as a single multi-tasked module, the features and functionality performed by this sensor 20 may be performed by multiple modules such as for example, a sensor module and a packet flow generation module. Additionally, to help ensure that each port is properly monitored, each sensor 20 may be associated with a redundant slave sensor which is operable to assume substantially all of the functionality of sensor 20 in the event of any failure of sensor 20.

Manager server 30 represents any hardware or software module that controls or monitors one or more servant nodes, such as sensor 20. In one example, each manager server 30 includes a correlation engine 140 and a ruleset 152 for receiving and correlating detected events 110 from sensors 20. Generally, through correlating and aggregating detected events 110, manager server 30 is capable of detecting an attack or potential attack spread among sensors 20. Manager server 30 is operable to dynamically respond to such a threat. For example, upon detecting an attack or potential attack, manager server 30 may disable certain network ports or restrict access to internal network 70.

According to certain embodiments, manager server 30 comprises a general-purpose personal computer (PC), a Macintosh, a workstation, a Unix-based computer, a server computer, or any suitable processing device. Manager server 30 may include any hardware, software, firmware, or combination thereof operable to receive and appropriately process detected events 110 and alerts (not shown) received from sensors 20. Manager server 30 outputs at least detected events 110. Manager server 30 is further operable to output alerts received from sensors 20 and/or alerts generated by manager server 30. According to certain embodiments, alerts received from sensors 20 or generated by manager server 30 may be combined with the event information of detected events 110. To make system 10 more robust, each manager server 30 may be associated with a redundant manager server which is operable to assume substantially all of the functionality of manager server 30 in the event of a failure of the associated manager server 30. Although FIG. 1 provides one example of manager server 30 that may be used with the invention, system 10 can be implemented using computers other than servers, as well as a server pool.

Global server 40 represents any hardware, software, firmware, or combination thereof operable to process, control, and monitor system 10 at the highest logical level. Global server 40 may comprise a general-purpose personal computer (PC), a workstation, a Unix-based computer, a server computer, or any other suitable processing device. Although FIG. 1 provides one example of global server 40 that may be used with the invention, system 10 can be implemented using computers other than servers, as well as a server pool.

According to certain embodiments, global server 40 comprises a correlation engine 140. Correlation engine 140 is operable to correlate detected events 110 to detect an attack occurring upon or within the enterprise. Correlation engine 140 is further operable to correlate detected events 110 with attacker profiles 224 (illustrated in FIG. 2) to identify the source of an attack. Correlation engine 140 may be any software or logic operable to process multiple communications from servant nodes and may use any suitable detection or comparison technique to process packet headers, packet payloads, and/or any other data. Correlation engine 140 may be written in any appropriate computer language such as, for example, C, C++, Java, Perl, and others. It will be understood by those skilled in the art that correlation engine 140 may reside locally in manager server 30, global server 40, remotely on another computer server, or distributed across servers. It will be further understood that while correlation engine 140 is illustrated as a single module, the features and functionalities performed by this module may be performed by multiple modules.

In certain embodiments, correlation engine 140 is communicatively connected to a memory module 150. Memory module 150 stores detected events 110 received by sensors 20 for later processing, retrieval, or searches. Memory module 150 may include any memory or database module and may take the form of volatile or non-volatile memory comprising, without limitation, magnetic media, optical media, random access memory (RAM), read-only memory (ROM), removable media, or any other suitable local or remote memory component. Correlation engine 140 is operable to process event information of detected events 110 stored in memory module 150 to detect the presence of a substantially long-term or multi-staged attack that had previously gone undetected by sensors 20 and manager servers 30.

According to certain embodiments, memory module 150 comprises a ruleset 152. Ruleset 152 comprises instructions, algorithms, or any other directives used by correlation engine 140 to process, correlate, aggregate, and/or filter event information of detected events 110. Ruleset 152 is discussed in further detail below with respect to FIG. 2. Although FIG. 1 illustrates ruleset 152 and memory module 150 as residing internally to global server 40, ruleset 152 and memory module 150 may reside externally or at any other location or locations accessible by global server 40 or other components of system 10.

Console 50 represents any computer that may comprise input devices, output devices, mass storage media, processors, memory, or other components for receiving, processing, storing, and/or communicating information. Intrusion detection system 10 may communicate the event information of detected events 110 to console 50 so that a user, such as an operator (not shown), may view and process the event information of detected events 110. Console 50 may be, alternatively or additionally, linked to one or more manager servers 30 and/or global servers 40 without departing from the scope of this disclosure. It will be understood that there may be any number of consoles 50 used in system 10.

Console 50 may include a graphical user interface (GUI) 52 that tailors and filters the data presented to the user. Generally, GUI 52 provides the operator of console 50 with an efficient and user-friendly presentation of event information of detected events 110. GUI 52 may open a secure shell (SSH) tunnel to provide additional secure communications between console 50 and the other portions of system 10. GUI 52 may comprise a plurality of displays having interactive fields, pull-down lists, and buttons operated by an operator. In one example, GUI 52 presents the relevant event information of each detected event 110 to the operator and conceals the remaining information in order to reduce visual clutter. Then, upon receiving a request from the operator, GUI 52 expands the visual representation of event information to display packet headers and payloads to the operator. GUI 52 may include multiple levels of abstraction including groupings and boundaries. It should be understood that the term graphical user interface may be used in the singular or in the plural to describe one or more graphical user interfaces and each of the displays of a particular graphical user interface.

Figure 2:
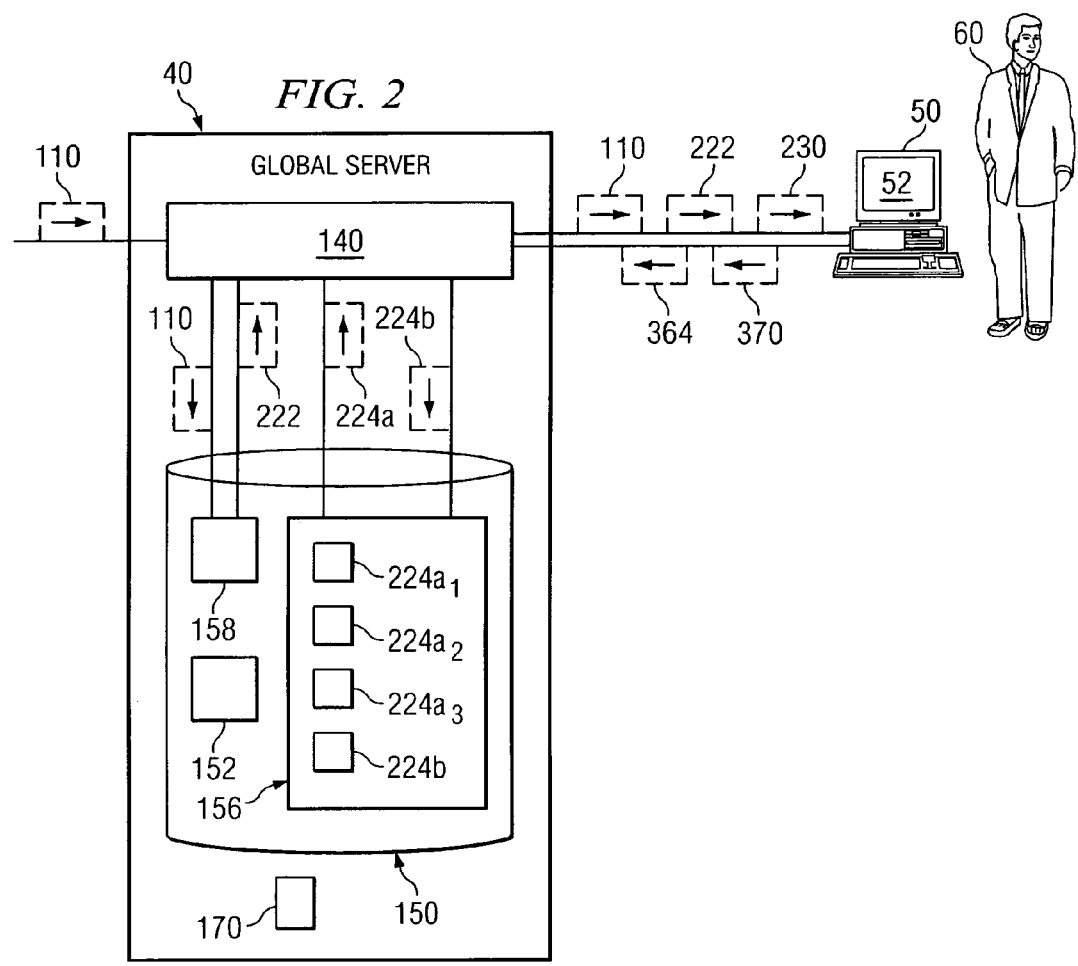
FIG. 2 illustrates a flow of operation among various components of the system illustrated in FIG. 1.

FIG. 2 illustrates a flow of operation among various components of system 10 illustrated in FIG. 1. Global server 40 receives detected events 110, such as from manager servers 30. Each detected event 110 comprises a plurality of characteristics such as, for example, time, source IP address, and destination IP address. These characteristics are referred to as attributes 410 (illustrated in FIG. 3). Correlation engine 140 processes each detected event 110 according to attributes 410 of that detected event 110. In particular, correlation engine 140 assigns attribute values 420 (illustrated in FIG. 3) to each detected event 110 according to the particular attributes 410 of that detected event 110. A particular attribute value 420 is a numerical value that corresponds to a particular attribute 410 of detected event 110. Correlation engine 140 uses rules stored in ruleset 152 to determine which attribute values 420 to assign to a particular detected event 110.

An example illustrates certain embodiments of the present invention. Global server 40 receives detected event 110a, which occurred at 5:25 p.m. and originated from source IP address 205.252.48.163. One attribute 410a of detected event 110a is time—5:25 p.m. Another attribute 410b of detected event 110a is source IP address—205.252.48.163. In the present example, ruleset 152 comprises a rule to assign to each detected event 110 an attribute value 420a equal to the decimal time of that detected event 110. Based on this rule, correlation engine 140 assigns to detected event 110a attribute value 420a of 17.42—the decimal form of 5:25 p.m. Ruleset 152 also comprises a rule to assign to each detected event 110 an attribute value 420b equal to the base ten form of the source IP address of that detected event 110. Based on this rule, correlation engine 140 assigns to detected event 110a attribute value 420b of 3455856803—the base ten form of 205.252.48.163.

It will be understood that correlation engine 140 may assign any number of attribute values 420 to a particular detected event 110. In particular, correlation engine 140 may assign attributes values 420 that correspond to attributes 410 such as, for example, type of device that generated detected event 110, payload of detected event 110, type of code in detected event 110, day of week of detected event 110, or any other suitable attribute 410 of detected event 110.

Figures 3, 4:
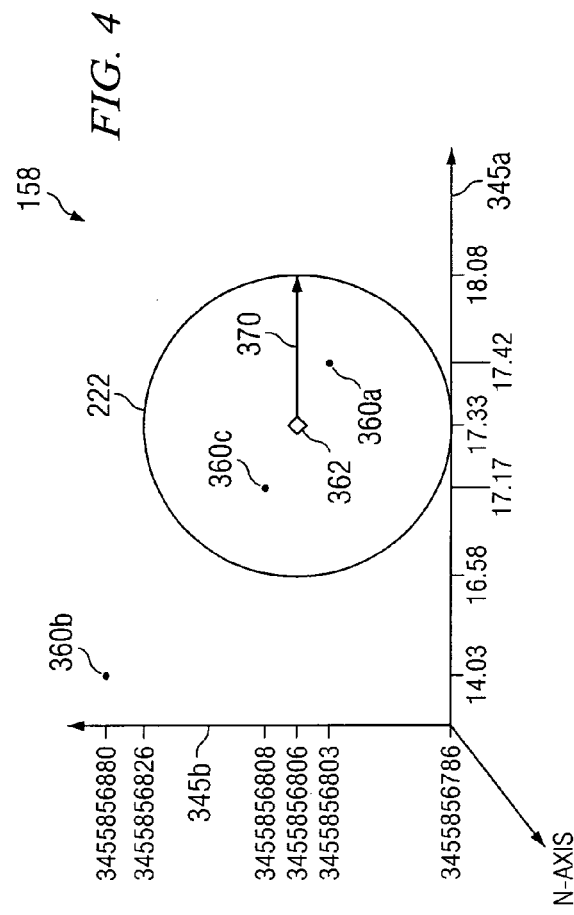
FIG. 3 illustrates a table of event information according to one embodiment of the present invention.
FIG. 4 illustrates stored event information according to one embodiment of the present invention.

According to certain embodiments, correlation engine 140 stores each detected event 110 in detected event storage 158 according to attribute values 420 of that detected event 110. Detected event storage 158 refers to a portion or portions of memory module 150 used to store detected events 110 according to attribute values 420 assigned by correlation engine 140. Although FIG. 2 depicts detected event storage 158 as a portion of memory module 150, detected event storage 158 may reside externally to memory module 150 or at any other location or locations accessible by global server 40 or other components of system 10. Referring briefly to FIG. 4, attribute values 420 of each detected event 110 define a point 360 in n-dimensional space in detected event storage 158. In the preceding example, correlation engine 140 assigned to detected event 110a attribute value 420a of 17.42—corresponding to decimal time of detected event 110a—and attribute value 420b of 3455856803—corresponding to base ten source IP address of detected event 110a. In an n-dimensional space with a first axis 345a representing decimal time and a second axis 345b representing base ten source IP address, attribute values 420a and 420b of detected event 110a define a point 360a at coordinates 17.42 and 3455856803, respectively. Because correlation engine 140 may assign any number of attribute values 420 to detected events 110, there may be any number of axes 345 in n-dimensional space, each axis 345 corresponding to a particular class of attribute values 420 of detected events 110.

Referring back to FIG. 2, correlation engine 140 is operable to correlate detected events 110 in detected event storage 158 to detect an attack occurring upon or within the enterprise. Correlation engine 140 is further operable to determine the likely identity of an attacker. According to certain embodiments, correlation engine 140 correlates detected events 110 using a target event 364 and proximity limits 370. Target event 364 is an event selected or defined by operator 60 to serve as the basis for correlating detected events 110 in detected event storage 158. Target event 364 comprises one or more attributes 410 such as, for example, time, source IP address, and destination IP address. According to certain embodiments, operator 60 selects a particular detected event 110 displayed on GUI 52 to serve as target event 364. In other embodiments, operator 60 may arbitrarily define target event 364 by inputting into console 50 attributes 410 of target event 364. Correlation engine 140 assigns to target event 364 attribute values 420 corresponding to attributes 410 of target event 364. Correlation engine 140 determines attribute values 420 of target event 364 based on rules stored in ruleset 152.

An example illustrates certain embodiments of the present invention. Global server 40 receives detected event 110*d*, which occurred at 5:20 p.m. and originated from source IP address 205.252.48.166. Detected event 110*d* comprises a section of code indicating that detected event 110*d* is an attack. GUI 52 displays detected event 110*d* to operator 60. While investigating this attack, operator 60 wants to determine whether any other detected events 110 in detected event storage 158 are similar to detected event 110*d*. Accordingly, operator 60 uses console 50 to select detected event 110*d* to be target event 364. Console 50 sends target event 364 to global server 40. Correlation engine 140 processes target event 364 by assigning attribute values 420 to target event 364 in accordance with ruleset 152. In the present example, ruleset 152 comprises a rule to assign attribute value 420*a* equal to the decimal time of target event 364. Accordingly, correlation engine 140 assigns to target event 364 attribute value 420*a* of 17.33. Ruleset 152 also comprises a rule to assign to target event 364 attribute value 420*b* equal to base ten source IP address. Accordingly, correlation engine 140 assigns to target event 364 attribute value 420*b* of 3455856806.

Operator 60 may select a particular detected event 110*d* to be target event 364 for various reasons. For example, operator 60 may want a particular detected event 110 to serve as target event 364 because the particular detected event 110 is an attack on internal network 70. By correlating other detected events 110 stored in detected event storage 158 with the attack—that is, target event 364—system 10 may identify certain detected events 110 in detected event storage 158 that are similar to the attack. By identifying other detected events 110 in detected event storage 158 that are similar to the attack, operator 60 may be better able to identify the attacker and thereby preempt future attacks.

In some embodiments, it is not necessary for operator 60 to select a particular detected event 110 to be target event 364. Operator 60 may arbitrarily define target event 364. For example, operator 60 may know from an external source that an attacker typically attacks around 3:00 p.m. using source IP address 205.252.48.166. Operator 60 may use this information to arbitrarily define attributes 410 of target event 364. Accordingly, operator 60 may input into console 50 3:00 p.m. as the time of target event 364 and 205.252.48.166 as the source IP address of target event 364. Console 50 then sends target event 364 to global server 40.

Referring briefly to FIG. 4, attribute values 420 of target event 364 define target point 362 in n-dimensional space. Target point 362 is the base point used by correlation engine 140 in correlating detected events 110 in detected event storage 158. Attribute values 420 of detected events 110 in detected event storage 158 define points 360 in n-dimensional space. According to certain embodiments, the similarity between target event 364 and detected event 110 in detected event storage 158 corresponds to the distance between target point 362 and point 360 defined by attribute values 420 of detected event 110.

In addition to using target event 364, correlation engine 140 uses proximity limits 370 to correlate detected events 110 in detected event storage 158. Proximity limits 370 are numerical values corresponding to particular attributes 410 of target event 364. Proximity limits 370 define a portion of n-dimensional space surrounding target point 362. Referring back to FIG. 2, once operator 60 inputs target event 364 into console 50, GUI 52 requests operator 60 to input proximity limits 370. Once operator 60 inputs proximity limits 370 into console 50, console 50 sends proximity limits 50 to global server 40. Correlation engine 140 receives target event 364 and proximity limits 370 and assigns attribute values 420 to target event 364 and proximity limits 370 based on ruleset 152. Attribute values 420 of target event 364 define target point 362 in n-dimensional space. Generally, correlation engine 140 uses proximity limits 370 to identify a portion of n-dimensional space surrounding target point 362. Proximity limits 370 define the boundaries of that portion of n-dimensional space surrounding target point 362. Correlation engine 140 then identifies certain points 360 that are within that portion of n-dimensional space defined by proximity limits 370. These points 360 identified by correlation engine 140 correspond to certain detected events 110 referred to as identified detected events 222. Generally, identified detected events 222 are similar to target event 364 because identified detected events 222 correspond to points 360 that are within the range of attribute values 420 defined by proximity limits 370.

An example illustrates certain embodiments of the present invention. Sensors 20 receive three detected events 110*a*, 110*b*, and 110*c*. Referring to FIG. 3, event 110*a* occurred at 5:25 p.m. and originated from source IP address 205.252.48.163. Event 110*b* occurred at 2:02 p.m. and originated from source IP address 205.252.48.240. Event 110*c* occurred at 5:10 p.m. and originated from source IP address 205.252.48.168. Ruleset 152 comprises a rule to assign attribute value 420*a* equal to the decimal time of detected event 110. Accordingly, correlation engine 140 assigns to detected events 110*a*, 110*b*, and 110*c* attribute values 420*a* of 17.42, 14.03, and 17.17, respectively. Ruleset 152 comprises another rule to assign attribute value 420*b* equal to the base ten source IP address of detected event 110. Accordingly, correlation engine 140 assigns to detected events 110*a*, 110*b*, and 110*c* attribute values 420*b* of 3455856803, 3455856880, and 3455856808, respectively. Correlation engine 140 stores detected events 110*a*, 110*b*, and 110*c* in detected event storage 158 in accordance with attribute values 420 assigned by correlation engine 140.

In the present example, operator 60 learns from an external source that an attack on internal network 70 occurred at 5:20 p.m. from source IP addresses 205.252.48.166. Operator 60 wants to determine whether there are detected events 110 in detected event storage 158 that are similar to that attack. Accordingly, operator 60 inputs that attack into console 50 as target event 364. In particular, operator 60 inputs 5:20 p.m. as the time of target event 364 and 205.252.48.166 as the source IP address of target event 364. Console 50 sends target event 364 to global server 40. Based on a rule in ruleset 152, correlation engine 140 assigns to target event 364 attribute value 420*a* of 17.33—the decimal form of 5:20 p.m. Based on another rule in ruleset 152, correlation engine 140 assigns to target event 364 attribute value 420*b* of 3455856806—the base ten source IP address of target event 364.

In the present example, operator 60 specifically wants to identify detected events 110 in detected event storage 158 that originated within forty-five minutes and twenty IP address units of target event 364. Accordingly, operator 60 inputs into console 50 proximity limit 370*a* of forty-five minutes and proximity limit 370*b* of twenty address units. Console 50 sends proximity limits 370 to global server 40. Based on a rule in ruleset 152, correlation engine 140 assigns to proximity limit 370a attribute value 420a of 0.75—the decimal form of forty-five minutes. Based on another rule in ruleset 152, correlation engine 140 assigns to proximity limit 370b attribute value 420b of 20—the base ten form of twenty address units.

In the present example, attribute values 420 of target event 364 define target point 362 in n-dimensional space. Target point 362 has coordinates of 17.33 and 3455856806. Based on target point 362 and proximity limits 370, correlation engine 140 identifies those detected events 110 in detected event storage 158 within proximity limits 370 of target point 362. In particular, correlation engine 140 identifies a portion of n-dimensional space surrounding target point 362 defined by decimal time of 17.33 and base ten source IP address of 3455856806. The boundaries of that portion of n-dimensional space are defined by proximity limits 370—that is, within 0.75 hours of 17.33 and within twenty units of 3455856806.

Referring to FIG. 4, first axis 345a corresponds to attribute value 420a of decimal time. Second axis 345b corresponds to attribute value 420b of base ten source IP address. Attribute values 420 of detected event 110a define point 360a in n-dimensional space at coordinates 17.42 and 3455856803, respectively. Attribute values 420 of detected event 110b define point 360b in n-dimensional space at coordinates 14.03 and 3455856880, respectively. Attribute values 420 of detected event 110c define point 360c in n-dimensional space at coordinates 17.17 and 3455856808, respectively. Attribute values 420 of target event 364 define a target point 362 in n-dimensional space at 17.33 and 3455856806, respectively. The similarity between target event 364 and detected events 110 corresponds to the distance between target point 362 and points 360 defined by attribute values 420 of detected events 110.

In the present example, proximity limits 370—0.75 decimal time and twenty IP address units—define a portion of n-dimensional space surrounding target point 362. Correlation engine 140 identifies points 360 within the portion of n-dimensional space defined by proximity limits 370. In the present example, points 360a and 360c—corresponding to detected events 110a and 110c, respectively—are within proximity limits 370 of target point 362. Point 360b corresponding to detected event 110b, however, is not within proximity limits 370 of target point 362. Accordingly, correlation engine 140 identifies points 360a and 360b—corresponding to detected events 110a and 110c—as within proximity limits 370 of target point 362. Global server 40 sends to console 50 detected events 110a and 110c as identified detected events 222. GUI 52 displays identified detected events 222 to operator 60. Operator 60 thus learns which detected events 110 in detected event storage 158 are within proximity limits 370 of target event 364. By identifying detected events 110 that are similar to the attack represented by target event 364, operator 60 may be better able to prevent future attacks.

Referring back to FIG. 2, the present invention is operable to determine the likely identity of an attacker by correlating identified detected events 222 with one or more existing attacker profiles 224a stored in profile set 156. If identified detected events 222 do not correlate with one or more existing attacker profiles 224a, correlation engine 140 is operable to generate a new attacker profile 224b based on the event information of identified detected events 222. Each existing attacker profile 224a comprises a plurality of characteristics of an attacker of an enterprise's computer network. In certain embodiments, existing attacker profile 224a includes name and background information such as, for example, last known residence or last known employer. For example, a particular existing attacker profile 224a may correspond to an individual who typically launches attacks between 5:00 p.m. and 5:30 p.m. using external computers with IP addresses between 205.252.48.160 and 205.252.48.200. These characteristics are included in existing attacker profile 224a for this individual. By determining the identity of an attacker, operator 60 may be able to preempt future attacks.

According to certain embodiments, memory module 150 comprises profile set 156. Profile set 156 refers to one or more portions of memory module 150 used for storing attacker profiles 224. According to certain embodiments, correlation engine 140 identifies one or more existing attacker profiles 224a in profile set 156 that have characteristics that match or are similar to attributes 410 of identified detected events 222. Generally, correlation engine 140 determines identified detected events 222 by identifying detected events 110 in detected event storage 158 corresponding to points 360 that are within proximity limits 370 of target point 362. Correlation engine 140 then correlates identified detected events 222 with one or more existing attacker profiles 224a in profile set 156. In particular, correlation engine 140 may identify the particular existing attacker profile 224a in profile set 156 that most closely matches identified detected events 222. Global server 40 sends the identified existing attacker profile 224a to console 50 as identified attacker profile 230. GUI 52 displays identified attacker profile 230 to operator 60. Operator 60 thus learns the likely identity of the individual or organization that caused identified detected events 222.

According to certain embodiments, global server 40 comprises probability module 170. Probability module 170 comprises one or more Bayesian or neural networks. Probability module 170 may comprise processors, memory, logic, algorithms, directives, or data for implementing statistical methods for calculating conditional or other probabilities. In certain embodiments, correlation engine 140 uses probability module 170 to correlate identified detected events 222 with existing attacker profiles 224a in profile set 156. Probability module 170 may be combined with correlation engine 140 or may be located at any other location or locations accessible by global server 40 or other components of system 10.

An example illustrates certain embodiments of the present invention. Referring briefly to FIG. 4, correlation engine 140 determines identified detected events 222. Identified detected events 222 comprise detected event 110a and detected event 110c. As illustrated in FIG. 3, detected event 110a occurred at 5:25 p.m. and originated from source IP address 205.252.48.163. Detected event 110c occurred at 5:10 p.m. and originated from source IP address 205.252.48.168. Using probability module 170, correlation engine 140 attempts to correlate identified detected events 222 with one or more existing attacker profiles 224a stored in profile set 156.

In the present example, profile set 156 comprises several existing attacker profiles 224a for known attackers of enterprise computer networks. Existing attacker profile $224a_1$ in profile set 156 is for an attacker who typically attacks between 5:00 p.m. and 5:30 p.m. from source IP addresses between 205.252.48.160 and 205.252.48.200. Existing attacker profile $224a_2$ in profile set 156 is for an attacker who typically attacks between 2:00 p.m. and 4:00 p.m. from source IP addresses between 190.165.20.100 and 190.165.20.200. Because detected events 110a and 110c in identified detected events 222 both occurred between 5:00 p.m. and 5:30 p.m. and originated from source IP addresses between 205.252.48.160 and 205.252.48.200, existing attacker profile $224a_1$ most closely matches identified detected events 222. Accordingly, correlation engine 140 correlates identified detected events 222 with existing attacker profile $224a_1$. Global server 40 sends existing attacker profile $224a_1$ to console 50 as identified attacker profile 230. GUI 52 displays to operator 60 existing attacker profile $224a_1$, which comprises the name and certain background information of an individual known to attack enterprise computer networks. Operator 60 thus learns the likely identity of the individual who caused detected events 110a and 110c in identified detected events 222. By knowing the identity of this individual, operator 60 may be better able to preempt future attacks. Operator 60 may take steps such as, for example, blocking access from certain IP addresses or reporting this individual to law enforcement authorities.

According to certain embodiments, correlation engine 140 may be unable to correlate identified detected events 222 with one or more existing attacker profiles 224a in profile set 156. In particular, there may be no existing attacker profile 224a in profile set 156 that matches attributes 410 of identified detected events 222. If identified detected events 222 do not correlate with a particular existing attacker profile 224a, correlation engine 140 is operable to generate new attacker profile 224b based on attributes 410 of identified detected events 222. Correlation engine 140 is further operable to store new attacker profile 224b in profile set 156.

An example illustrates certain embodiments of the present invention. Correlation engine 140 determines identified detected events 222 comprising detected event 110a and detected event 110c. As illustrated in FIG. 3, detected event 110a occurred at 5:25 p.m. and originated from source IP address 205.252.48.163. Detected event 110c occurred at 5:10 p.m. and originated from source IP address 205.252.48.166. Using probability module 170, correlation engine 140 attempts to correlate identified detected events 222 with one or more existing attacker profiles 224a stored in profile set 156. In the present example, profile set 156 does not comprise a particular existing attacker profile 224a that matches attributes 410 of identified detected events 222. Correlation engine 140 is therefore unable to correlate identified detected events 222 with any existing attacker profiles 224a. Consequently, correlation engine 140 generates new attacker profile 224b based on attributes 410 of identified detected events 222. In the present example, correlation engine 140 generates a new attacker profile 224b of an attacker who typically attacks between 5:00 p.m. and 5:30 p.m. and who typically uses source IP addresses between 205.252.48.160 and 205.252.48.170. Correlation engine 140 stores new attacker profile 224b in profile set 156. In addition, global server 40 sends new attacker profile 224b to console 50 as identified attacker profile 230. GUI 52 displays new attacker profile 224b to operator 60. According to certain embodiments, GUI 52 may display to operator 60 that the identity of the attacker associated with new attacker profile 224b is unknown. However, operator 60 may track the unknown attacker associated with new attacker profile 224b by monitoring those detected events 110 thereafter received by sensors 20 that match new attacker profile 224b. According to certain embodiments, if operator 60 later learns the identify of the attacker associated with new attacker profile 224b, operator 60 may request console 50 to recall new attacker profile 224b. Operator 60 may then input into console 50 the name and background information of that attacker associated with new attacker profile 224b. Global server 40 may store in profile set 156 the name and background information of that attacker in association with new attacker profile 224b.

The present invention may be implemented in various enterprise computer networks. In particular, system 10 may be a military information system such as, for example, a military information system used to track supply levels of several battalions. In the present example, operator 60 is a military supply officer. Global server 40 receives detected event 110e, which occurred at 5:25 p.m. and originated from a UNIX-based computer. Ruleset 152 comprises a rule to assign attribute value 420a equal to the decimal time of detected event 110. Accordingly, correlation engine 140 assigns detected event 110e attribute value 420c of 17.42. Ruleset 152 also comprises a rule to assign attribute value 420d of three to detected events 110 that originate from UNIX-based computers. Correlation engine 140 therefore assigns attribute value 420d of three to detected event 110e. Correlation engine 140 stores detected event 110e in detected event storage 158 in accordance with the attribute values 420 of detected event 110e.

In the present example, an enemy attacker attempts to hack into system 10 to obtain sensitive information about supply levels tracked by system 10. System 10 detects this attack as detected event 110f, which occurred at 5:20 p.m. and originated from a UNIX-based computer. Detected event 110f contains a segment of code indicating that detected event 110f is an attack. Operator 60 of system 10 wants to determine whether any detected events 110 in detected event storage 158 may be related to this attack. In particular, operator 60 wants to identify detected events 110 in detected event storage 158 that occurred within forty-five minutes of 5:20 p.m. and that originated from UNIX-based computers. Accordingly, operator 60 selects detected event 110f as target event 364. Console 50 sends target event 364 to global server 40. Operator 60 enters "forty-five minutes" into console 50 as proximity limit 370a. Operator 60 enters "Unix-based computer" into console 50 as proximity limit 370d.

In the present example, correlation engine 140 assigns attribute values 420 to target event 364 based on rules in ruleset 152. Accordingly, correlation engine 140 also assigns target event 364 attribute value 420a of 17.33—the decimal form of 5:20 p.m. Correlation engine 140 assigns target event 364 attribute value 420d of three because target event 364 originated from a UNIX-based computer. Based on rules in ruleset 152, correlation engine 140 also assigns attribute values 420 to proximity limits 370. Proximity limit 370a corresponding to forty-five minutes is assigned an attribute value 420a of 0.75. Proximity limit 370d corresponding to the type of computer is assigned an attribute value 420d of three.

In the present example, correlation engine 140 identifies detected events 110 in detected event storage 158 that correspond to points 360 that are within proximity limits 370 of target point 362. In particular, correlation engine 140 identifies first detected event 110e that occurred at 5:25 p.m. and that originated from a UNIX-based computer. In the present example, detected event 110e occurred within forty-five minutes of target event 364 and originated from a UNIX-based computer. Correlation engine 140 identifies detected event 110e as identified detected event 222. Correlation engine 140 then attempts to correlate identified detected event 222 with one or more existing attacker profiles 224a in profile set 156. In the present example, profile set 156 comprises an existing attacker profile $224a_3$ for an attacker known to typically attack between 5:00 p.m. and 5:30 p.m. from UNIX-based computers. Because existing attacker profile $224a_3$ matches attributes 410 of identified detected event 222, correlation engine 140 correlates identified detected event 222 with existing attacker profile $224a_3$. Global server 40 sends existing attacker profile $224a_3$ to console 50 as identified attacker profile 230. GUI 52 displays existing attacker profile $224a_3$ to operator 60. Operator 60 thus learns the identity of the individual or organization that likely caused identified detected event 222.

The foregoing example illustrates a military information system that incorporates the present invention to detect an attack on a system and to correlate event information regarding the attack. The present invention may also be used to detect and correlate events other than attacks. For example, system 10 may be configured to detect and correlate information regarding supply levels of military units, movements of troops, maintenance of vehicles, conditions of weapons, or any other suitable type of event or information.

The present invention has several important technical advantages. Various embodiments of the invention may have none, some, or all of these advantages. According to certain embodiments, the present invention reduces the number of operations required to correlate certain detected events 110 with other detected events 110 in detected event storage 158, thus resulting in faster correlations. According to certain embodiments, the present invention enables correlation of detected events 110 with the identity of an attacker. By identifying the attacker, operator 60 is better able to respond to an attack, preempt future attacks, and gather evidence against the attacker.

Figure 5:
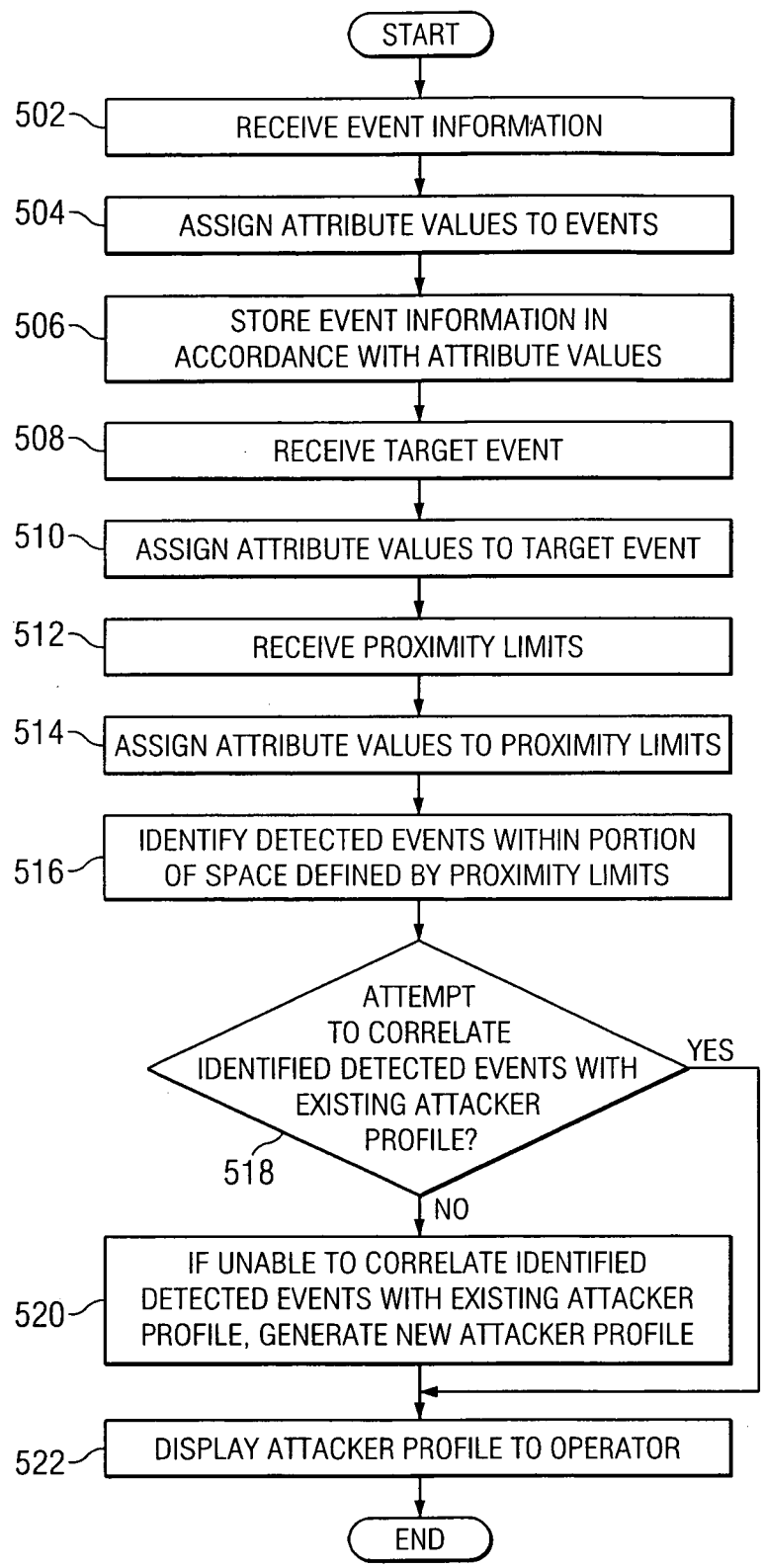
FIG. 5 illustrates a flow chart for correlating event information according to one embodiment of the present invention.

FIG. 5 illustrates a flow of operation according to one embodiment of the present invention. The method begins at step 502 where intrusion detection system 10 receives detected events 110. Each detected event 110 comprises a plurality of attributes 410 such as, for example, time, source IP address, and destination IP address. At step 504, correlation engine 140 assigns attribute values 420 to detected events 110 based on rules in ruleset 152. Attribute values 420 of each detected event 110 define a point 360 in n-dimensional space. At step 506, correlation engine 140 stores detected events 110 in detected event storage 158 according to attribute values 420 assigned by correlation engine 140. At step 508, correlation engine 140 receives target event 364. Target event 364 comprises a plurality of attributes 410 such as, for example, time, source IP address, and destination IP address. At step 510, correlation engine 140 assigns to target event 364 attribute values 420 based on rules in ruleset 152. Attribute values 420 of target event 364 define target point 362 in n-dimensional space. At step 512, correlation engine 140 receives proximity limits 370. Proximity limits 370 define a portion of n-dimensional space surrounding target point 362. At step 514, correlation engine 140 assigns attribute values 420 to proximity limits 370. At step 516, correlation engine 140 identifies those particular detected events 110 in detected event storage 158 corresponding to points 360 that are within proximity limits 370 of target point 362. Those particular detected events 110 identified by correlation engine 140 are referred to as identified detected events 222. At step 518, correlation engine 140 attempts to correlate identified detected events 222 with at least one existing attacker profile 224a in profile set 156. Existing attacker profile 224a comprises characteristics of a known attacker of enterprise computer networks. If correlation engine 140 is able to correlate identified detected events 222 with at least one existing attacker profile 224a, GUI 52 displays that existing attacker profile 224a to operator 60 at step 522. If correlation engine 140 is unable to correlate identified detected events 222 with at least one existing attacker profile 224a, correlation engine 140 generates new attacker profile 224b at step 520. New attacker profile 224b, which is based on identified detected events 222, is stored with identified detected events 222 in profile set 156 at step 518. At step 522, system 10 displays existing attacker profile 224a or new attacker profile 224b to operator 60.

The preceding examples illustrate system 10 as a centralized intrusion detection system 10—that is, sensors 20 and manager servers 30 send detected events 110 to a centralized global server 40 via a common internal network 70. Global server 40 then processes detected events 110 and provides operator 60 with a global view of the state of system 10. Certain intrusion detection systems 10, however, are de-centralized—that is, there is no global server 40. The present invention is operable to protect an enterprise with such a de-centralized architecture.

Figure 6:
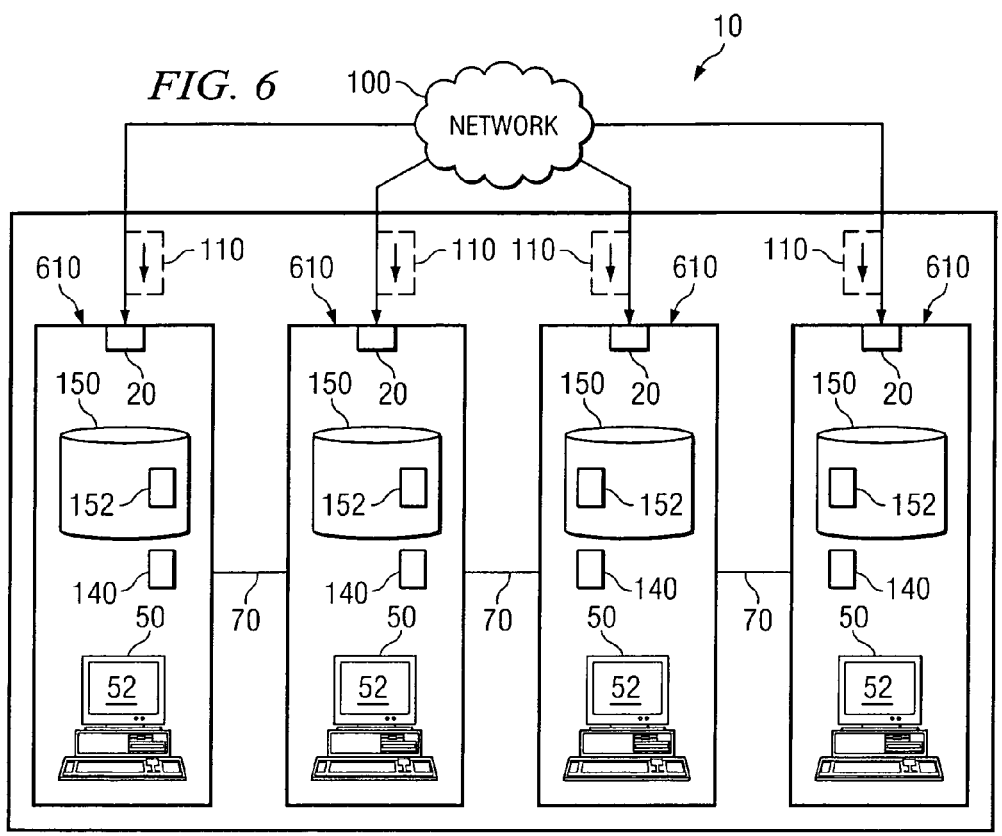
FIG. 6 illustrates an alternative architecture for the intrusion detection system according to one embodiment of the present invention.

FIG. 6 illustrates an alternative architecture for intrusion detection system 10. According to certain embodiments, intrusion detection system 10 comprises a plurality of network nodes 610. According to certain embodiments, network node 610 represents any computer that may comprise input devices, output devices, mass storage media, processors, memory, or other components for receiving, processing, storing, and/or communicating information. Network node 610 may comprise a general-purpose personal computer (PC), a Macintosh, a workstation, a Unix-based computer, a server computer, or any suitable processing device. Generally, network node 610 is capable of detecting an attack from network 100 and dynamically responding to such a threat. For example, upon detecting an attack or potential attack, network node 610 may disable certain network ports. Each network node 610 comprises sensor 20, correlation engine 140, memory module 150, and console 50.

Sensor 20 comprises the functionality of sensors 20 described with respect to FIG. 1. Each sensor 20 is located at a network port that receives TCP/IP packets or other similar network communications from network 100. These packets and similar network communications received by sensor 20 are referred to as detected events 110. Generally, sensor 20 processes detected events 110 to detect the presence of an attack. Sensor 20 outputs at least the event information of detected events 110. According to certain embodiments, sensor 20 may generate an alert (not shown) upon detecting an attack. Network 100 represents any network not protected by intrusion detection system 10. Accordingly, network 100 communicably couples system 10 with other computer systems.

Sensor 20 is communicatively connected to correlation engine 140. Generally, correlation engine 140 is operable to correlate detected events 110 to detect an attack occurring upon or within the enterprise. Correlation engine 140 may include any hardware, software, firmware, or combination thereof operable to receive and appropriately process detected events 110 and corresponding alerts (not shown) from sensor 20. Correlation engine 140 may be any software or logic operable to process multiple communications from servant nodes and may use any suitable detection or comparison technique to process packet headers, packet payloads, and/or any other data. Correlation engine 140 may be written in any appropriate computer language such as, for example, C, C++, Java, Perl, and others. It will be understood by those skilled in the art that correlation engine 140 may reside locally in network node 610, remotely on another computer server, or distributed across servers. It will be further understood that while correlation engine 140 is illustrated as a single module, the features and functionalities performed by this module may be performed by multiple modules.

In certain embodiments, correlation engine 140 is communicatively connected to memory module 150. Memory module 150 stores detected events 110 received by sensors 20 for later processing, retrieval, or searches. Memory module 150 may include any memory or database module and may take the form of volatile or non-volatile memory comprising, without limitation, magnetic media, optical media, random access memory (RAM), read-only memory (ROM), removable media, or any other suitable local or remote memory component. Correlation engine 140 is operable to process event information of detected events 110 stored in memory module 150 to detect the presence of a substantially long-term or multi-staged attack that had previously gone undetected.

According to certain embodiments, memory module 150 comprises a ruleset 152. Ruleset 152 comprises instructions, algorithms, or any other directives used by correlation engine 140 to process, correlate, aggregate, and/or filter event information of detected events 110. Ruleset 152 is discussed in further detail below with respect to FIG. 7. Although FIG. 6 illustrates ruleset 152 and memory module 150 as residing internally to network node 610, ruleset 152 and memory module 150 may reside externally or at any other location or locations accessible by network node 610 or other components of system 10.

Correlation engine 140 is communicatively connected to console 50. Console 50 represents any computer that may comprise input devices, output devices, mass storage media, processors, memory, or other components for receiving, processing, storing, and/or communicating information. Correlation engine 140 may communicate the event information of detected events 110 to console 50 so that a user, such as an operator 60, may view and process the event information of detected events 110.

Console 50 may include a graphical user interface (GUI) 52 that tailors and filters the data presented to operator 60. Generally, GUI 52 provides operator 60 of console 50 with an efficient and user-friendly presentation of event information of detected events 110. GUI 52 may open a secure shell (SSH) tunnel to provide additional secure communications between console 50 and the other portions of system 10. GUI 52 may comprise a plurality of displays having interactive fields, pull-down lists, and buttons operated by operator 60. In one example, GUI 52 presents the relevant event information of each detected event 110 to operator 60 and conceals the remaining information in order to reduce visual clutter. Then, upon receiving a request from operator 60, GUI 52 expands the visual representation of event information to display packet headers and payloads to operator 60. GUI 52 may include multiple levels of abstraction including groupings and boundaries. It should be understood that the term graphical user interface may be used in the singular or in the plural to describe one or more graphical user interfaces and each of the displays of a particular graphical user interface.

Network nodes 610 are communicatively coupled by internal network 70. Internal network 70 may include one or more intranets, local area networks (LANs), metropolitan area networks (MANs), wide area networks (WANs), or any other suitable enterprise network. Internal network 70 may, for example, communicate Internet Protocol (IP) packets, frame relay frames, Asynchronous Transfer Mode (ATM) cells, and/or other suitable messages between network addresses. According to particular embodiments, messages between network nodes 610 may be in one or more formats including Intrusion Detection Message Exchange Format (IDMEF), binary format, and/or other appropriate format. According to certain embodiments, internal network 70 represents a bandwidth constrained network connection such as, for example, a radio wave link or laser link.

Figure 7:
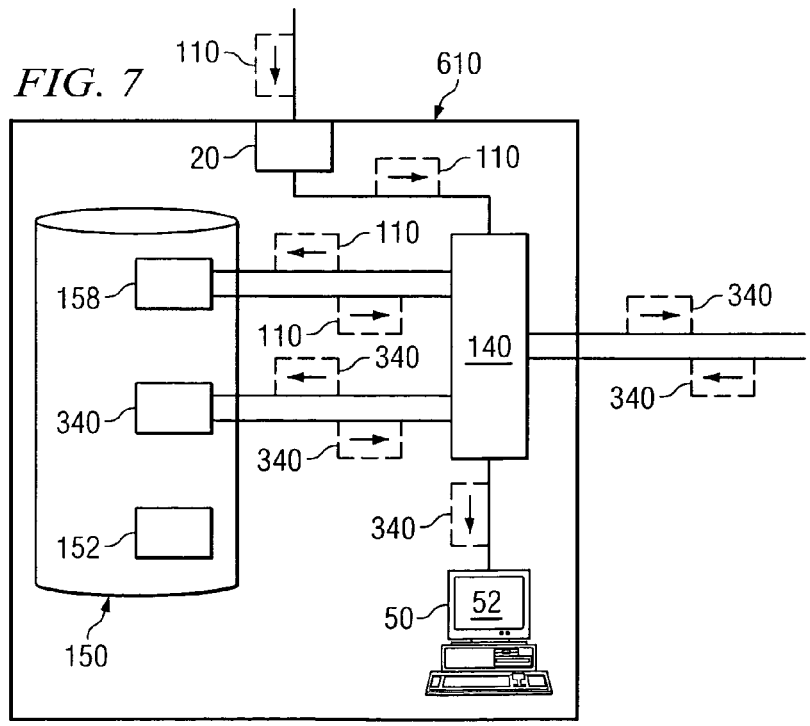
FIG. 7 illustrates a flow of operation among various components of the system illustrated in FIG. 6.

FIG. 7 illustrates a flow of operation among various components of system 10 illustrated in FIG. 6. Sensor 20 of network node 610 receives detected event 110. Sensor 20 sends detected event 110 to correlation engine 140. Detected event 110 comprises a plurality of attributes 410 such as, for example, time, source IP address, and destination IP address.

Based on rules in ruleset 152, correlation engine 140 assigns attribute values 420 to detected event 110. Correlation engine 140 then stores detected event 110 in detected event storage 158 according to attribute values 420. Detected event storage 158 refers to a portion or portions of memory module 150 used to store detected events 110 according to attribute values 420.

An example illustrates certain embodiments of the present invention. Network node 610 receives detected event 110a, which occurred at 5:25 p.m. and originated from source IP address 205.252.48.163. Time and source IP address are attributes 410 of detected event 110a. Ruleset 152 comprises a rule to assign attribute value 420a equal to the decimal time of detected event 110. Accordingly, correlation engine 140 assigns to detected event 110a attribute value 420a of 17.42—the decimal form of 5:25 p.m. Ruleset 152 comprises another rule to assign attribute value 420b equal to the base ten source IP address of detected event 110. Accordingly, correlation engine 140 assigns to detected event 110a attribute value 420b of 345585603—the base ten representation of 205.252.48.163. Correlation engine 140 may store detected event 110a in detected event storage 158 in accordance with attribute values 420 assigned by correlation engine 140.

According to certain embodiments, correlation engine 140 is operable to generate an n-dimensional graph 340 based on detected events 110 in detected event storage 158. N-dimensional graph 340 is a graph of points 360 corresponding to detected events 110 in detected event storage 158. Each point 360 is defined by attribute values 420 of a particular detected event 110. Correlation engine 140 is operable to store n-dimensional graph 340 in memory module 150.

An example illustrates certain embodiments of the present invention. Sensors 20 receive three detected events 110a, 110b, and 110c. Referring to FIG. 3, event 110a occurred at 5:25 p.m. and has a source IP address of 205.252.48.163 and a destination IP address of 192.187.23.220. Event 110b occurred at 2:02 p.m. and has a source IP address of 205.252.48.240 and a destination IP address of 192.187.23.206. Event 110c occurred at 5:10 p.m. and has a source IP address of 205.252.48.168 and a destination IP address of 192.187.23.102. Ruleset 152 comprises a rule to assign attribute value 420a equal to the decimal time of detected event 110. Accordingly, correlation engine 140 assigns to detected events 110a, 110b, and 110c attribute values 420a of 17.42, 14.03, and 17.17, respectively. Ruleset 152 comprises another rule to assign attribute value 420b equal to the base ten source IP address of detected event 110. Accordingly, correlation engine 140 assigns to detected events 110a, 110b, and 110c attribute values 420b of 3455856803, 3455856880, and 3455856808, respectively. Ruleset 152 comprises a third rule to assign attribute value 420c equal to the base ten destination IP address of detected event 110. Accordingly, correlation engine 140 assigns to detected events 110a, 110b, and 110c attribute values 420c of 3233486812, 3233486798, and 3233486694, respectively. Correlation engine 140 stores detected events 110a, 110b, and 110c in detected event storage 158 in accordance with attribute values 420 assigned by correlation engine 140.

In the present example, correlation engine 140 generates n-dimensional graph 340 based on detected events 110 in detected event storage 158. First axis 345a corresponds to decimal time, second axis 345b corresponds to base ten source IP address, and third axis 345c corresponds to base ten destination IP address. Each detected event 110 corresponds to a particular point 360 defined by attribute values 420 of that detected event 110. In the present example, attribute values 420 of detected event 110a define point 360a with coordinates of 17.42, 3455856803, and 3233486812. Attribute values 420 of detected event 110b define point 360b with coordinates of 14.03, 3455856880, and 3233486798. Attribute values 420 of detected event 110c define point 360c with coordinates of 17.17, 3455856808, and 3233486694. Correlation engine 140 stores n-dimensional graph 340 comprising points 360a, 360b, and 360c in memory module 150. Because correlation engine 140 may assign any number of attribute values 420 to detected events 110, there may be any number of axes 345 in n-dimensional graph 340, each axis 345 corresponding to a particular class of attribute values 420 of detected events 110.

According to certain embodiments, correlation engine 140 is operable to use any suitable lossy or lossless compression technique to compress and/or decompress n-dimensional graph 340. In particular, correlation engine 140 may define points 360 in n-dimensional graph 340 by using less than all of attribute values 420 of detected events 110 corresponding to points 360. An example illustrates certain embodiments of the present invention. In the preceding example, network node 610 received three detected events 110a, 110b, and 110c. Correlation engine 140 assigned to these detected events a plurality of attribute values 420 as illustrated in FIG. 3. Attribute value 420a corresponds to decimal time, attribute value 420b corresponds to base ten source IP address, and attribute value 420c corresponds to base ten destination IP address. Correlation engine 140 stored detected events 110a, 110b, and 110c in detected event storage 158 in accordance with attribute values 420 assigned by correlation engine 140. In the present example, correlation engine 140 generates n-dimensional graph 340 using only attribute values 420a and 420b of detected events 110. Thus, points 360 of n-dimensional graph 340 are defined by attribute values 420a and 420b but not 420c of detected events 110. By using less than all of attribute values 420 of detected events 110 to generate n-dimensional graph 340, correlation engine 140 compresses the amount of information represented by points 360 in n-dimensional graph 340. Such a compressed n-dimensional graph 340 may not require as much bandwidth for transmission as does an n-dimensional graph 340 comprising points 360 defined by all of attribute values 420 of detected events 110.

In a de-centralized system 10 comprising multiple network nodes 610, operator 60 of a particular network node 610 may want to review the event information of detected events 110 received by other network nodes 610 in system 10. By reviewing the event information of detected events 110 received by other network nodes 610, a particular operator 60 may obtain a more complete view of the state of system 10. According to certain embodiments, the present invention facilitates a more complete view of the state of system 10.

Figure 8:
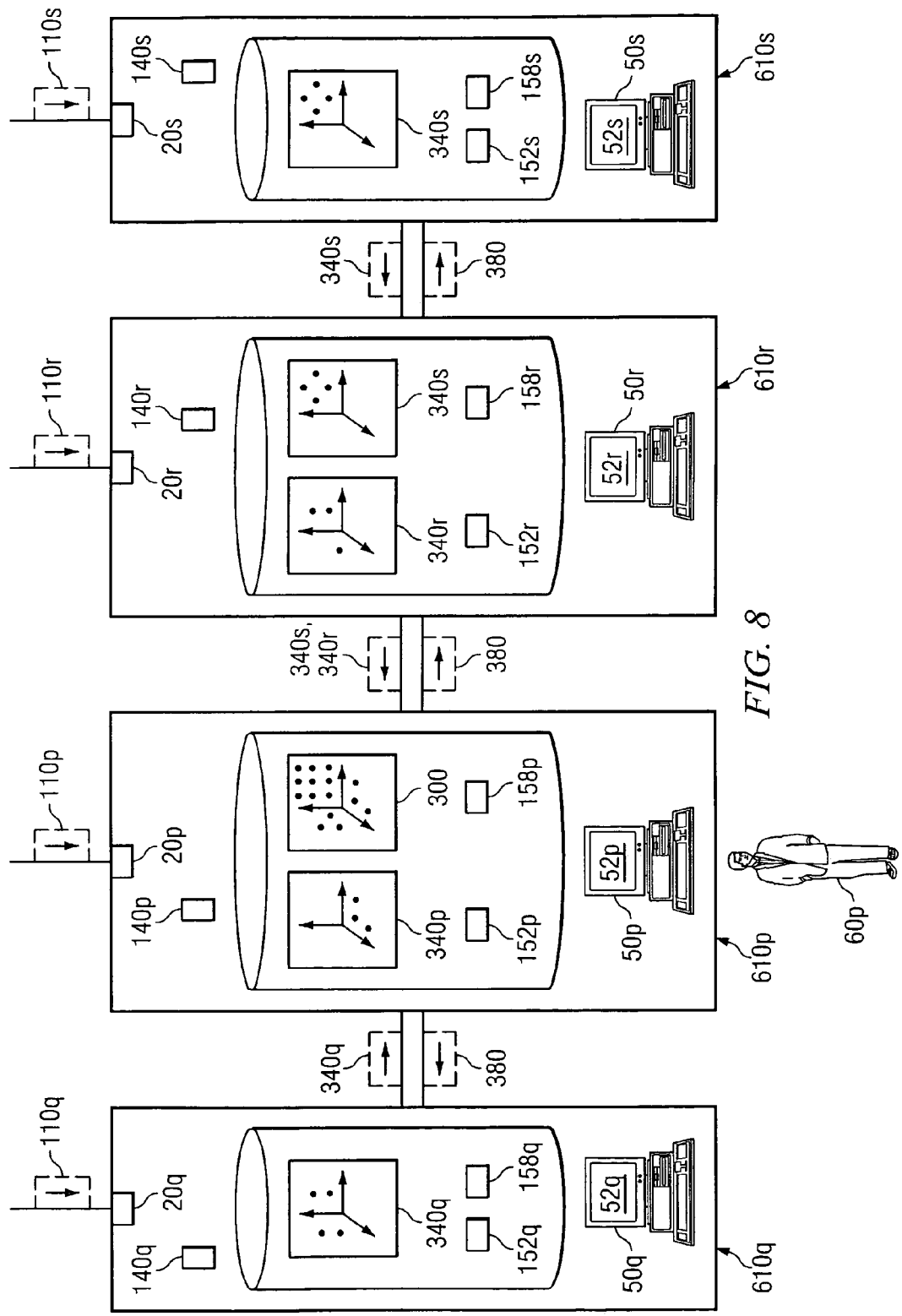
FIG. 8 illustrates a flow of operation among various components of the system illustrated in FIG. 6.

FIG. 8 illustrates a flow of operation among various components depicted in FIGS. 6 and 7. According to certain embodiments, system 10 comprises network nodes 610p, 610q, 610r, and 610s. Sensor 20 of each network node 610 receives detected events 110. Detected events 110 received by one network node 610 may differ from detected events 110 received by another network node 610. Each detected event 110 comprises a plurality of attributes 410 such as, for example, time, source IP address, and destination IP address. Sensor 20 sends detected events 110 to correlation engine 140. Based on ruleset 152, correlation engine 140 assigns attribute values 420 to each detected event 110 according to attributes 410 of detected events 110. Attribute values 420 of each detected event 110 define a point 360 in n-dimensional space. Correlation engine 140 stores detected events 110 in detected event storage 158 according to attribute values 420 of detected events 110. In addition, correlation engine 140 generates n-dimensional graph 340 comprising points 360 defined by attribute values 420 of detected events 110. Correlation engine 140 stores n-dimensional graph 340 in memory module 150. According to certain embodiments, a particular network node 610 may receive n-dimensional graph 340 from another network node 610 via internal network 70. According to certain embodiments, internal network 70 may be a bandwidth constrained network connection such as, for example, a radio wave link or laser link between network nodes 610.

An example illustrates certain embodiments of the present invention. System 10 comprises network nodes 610p, 610q, 610r, and 610s. Network nodes 610 are communicatively connected via internal network 70. Network nodes 610p, 610q, 610r, and 610s receive detected events 110p, 110q, 110r, and 110s, respectively. Sensor 20p in network node 610p sends detected events 110p to correlation engine 140p. Correlation engine 140p assigns detected events 110p attribute values 420 in accordance with attributes 410 of detected events 110p. Correlation engine 140p stores detected events 110p in detected event storage 158p in accordance with attribute values 420 assigned by correlation engine 140p. Correlation engines 140q, 140r, and 140s similarly process and store detected events 110q, 110r, and 110s, respectively. Network node 610p generates n-dimensional graph 340p comprising points 360p defined by attribute values 420 of detected events 110p. Network node 610p stores n-dimensional graph 340p in memory module 150p. Network nodes 610q, 610r, and 610s each generate and store respective n-dimensional graphs 340 comprising points 360 corresponding to detected events 110q, 110r, and 110s, respectively.

In the present example, operator 60p of network node 610p wants to obtain a complete view of the state of system 10. In particular, operator 60p wants to determine whether detected events 110 received by other network nodes 610 are related to detected events 110p received by network node 610p. Accordingly, operator 60p decides to review detected events 110 received by other network nodes 610. Operator 60p inputs into console 50p a graph request 380. Graph request 380 is a signal or message to network nodes 610 to send their respective n-dimensional graphs to the particular network node 610 sending graph request 380. In the present example, network node 610p sends graph request 380 to network nodes 610q and 610r. Network node 610r in turn sends graph request 380 to network node 610s.

Upon receiving graph request 380, network node 610s sends n-dimensional graph 340s to network node 610r via internal network 70. Network node 610r receives n-dimensional graph 340s from network node 610s and stores n-dimensional graph 340s in memory module 150r. Correlation engine 140r in network node 610r then sends n-dimensional graphs 340r and 340s to network node 610p. Network node 610p receives n-dimensional graphs 340r and 340s from network node 610r and stores n-dimensional graphs 340r and 340s in memory module 150p.

In the present example, network node 610q also sends n-dimensional graph 340q to network node 610p via internal network 70. Network node 610p receives n-dimensional graph 340q from network node 610q and stores n-dimensional graph 340q in memory module 150p. According to certain embodiments GUI 52p in network node 610p displays n-dimensional graphs 340p, 340q, 340r, and 340s to operator 60p of network node 610p. Thus, operator 60p obtains a more complete view of the state of system 10.

According to certain embodiments, correlation engine 140 is operable to combine n-dimensional graphs 340 received from various network nodes 610 into a global n-dimensional graph 300. Global n-dimensional graph 300 is a graph comprising points 360 of a plurality of individual n-dimensional graphs 340 generated by network nodes 610. Points 360 of n-dimensional graphs 340 are defined by attribute values 420 of detected events 110 assigned by correlation engines 140 based on attributes 410 of detected events 110. Accordingly, the location of a particular point 360 in global n-dimensional graph 300 signifies attributes 410 of detected event 110 corresponding to that point 360.

Referring to the preceding example, correlation engine 140p of network node 610p generates global n-dimensional graph 300 by combining n-dimensional graph 340p with n-dimensional graphs 340q, 340r, and 340s in memory module 150p. Global n-dimensional graph 300 comprises points 360p, 360q, 360r, and 360s from n-dimensional graphs 340p, 340q, 340r, and 340s. Points 360p, 360q, 360r, and 360s in global n-dimensional graph 300 are defined by attribute values 420 of detected events 110p, 110q, 110r, and 110s. Attribute values 420 of detected events 110p, 110q, 110r, and 110s correspond to attributes 410 of detected events 110p, 110q, 110r, and 110s.

Correlation engine 140 is operable to process global n-dimensional graph 300 to detect attacks or potential attacks spread among network nodes 610. Correlation engine 140 may use any suitable algorithms, mathematical formulas, Gaussian distribution functions, or comparison techniques for scanning global n-dimensional graph 300 to detect patterns or clusters 310 of points 360 in global n-dimensional graph 300. A cluster 310 of points 360 refers to a concentrated grouping of points 360 in global n-dimensional graph 300. According to certain embodiments, clusters 310 of points 360 in global n-dimensional graph 300 may represent an attack spread among network nodes 610.

Figure 9:
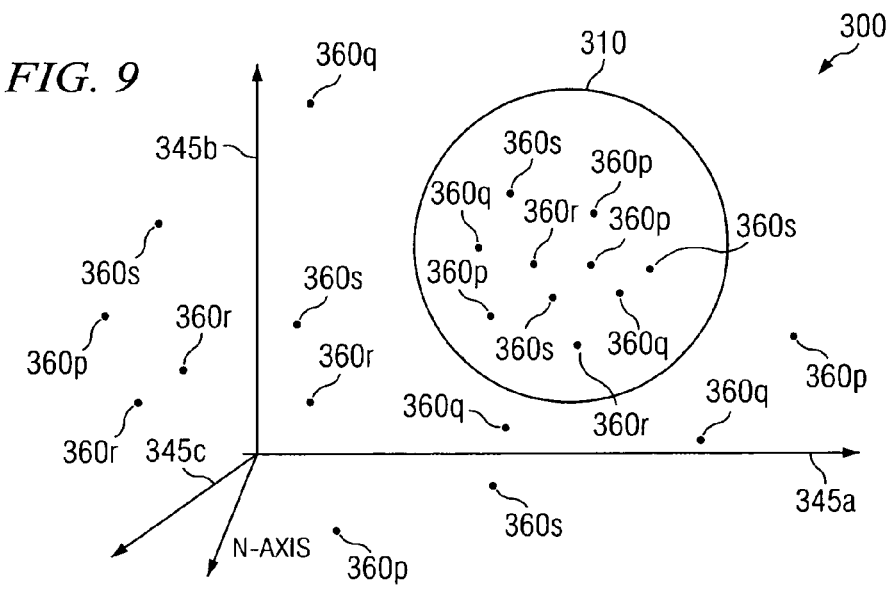
FIG. 9 illustrates stored event information according to one embodiment of the present invention.

FIG. 9 illustrates a cluster 310 of points 360 in global n-dimensional graph 300. The axes 345 of global n-dimensional graph 300 correspond to attribute values 420 of detected events 110. The location of a particular point 360 in global n-dimensional graph 300 is defined by attribute values 420 of detected event 110 corresponding to that particular point 360.

An example illustrates certain embodiments of the present invention. First axis 345a corresponds to decimal time of detected events 110. Second axis 345b corresponds to base ten source IP address of detected events 110. Third axis 345c corresponds to base ten destination IP address of detected events 110. Global n-dimensional graph 300 is a combination of n-dimensional graphs 340p, 340q, 340r, and 340s generated by network nodes 610p, 610q, 610r, and 610s, respectively. Points 360p are defined by attribute values 420 of detected events 110p received by network node 610p. Points 360q are defined by attribute values 420 of detected events 110q received by network node 610q. Points 360r are defined by attribute values 420 of detected events 110r received by network node 610r. Points 360s are defined by attribute values 420 of detected events 110s received by network node 610s.

In the present example, correlation engine 140p in network node 610p processes global n-dimensional graph 300 to detect clusters 310 or patterns that may signify attacks spread among network nodes 610. In particular, correlation engine 140p detects cluster 310 of points 360 in global n-dimensional graph 300. Cluster 310 comprises three points 360p from n-dimensional graph 340p, two points 360q from n-dimensional graph 340q, two points 360r from n-dimensional graph 340r, and three points 360s from n-dimensional graph 340s. Points 360 in cluster 310 are close together, signifying that points 360 in cluster 310 have similar attribute values 420 for decimal time, base ten source IP address, and base ten destination IP address. Accordingly, cluster 310 may suggest that an attacker is attacking multiple network nodes 610 from similar source IP addresses and using similar destination IP addresses. Cluster 310 may also suggest an unusual level of activity occurring at a certain time of day. Cluster 310 of points 360 may not have been apparent in an individual n-dimensional graph 340 used to generate global n-dimensional graph 300. Cluster 310 may have only become apparent by combining n-dimensional graphs 340 into global n-dimensional graph 300.

In certain embodiments, correlation engine 140 is operable to distinguish among points 360 in global n-dimensional graph 300 by using "dimming" techniques. "Dimming" refers to prioritizing points 360 in global n-dimensional graph 300 based on which network node 610 originally received which detected events 110. According to certain embodiments, dimming may comprise reducing the visibility of certain points 360 in global n-dimensional graph 300. In particular, correlation engine 140 may dim points 360 in global n-dimensional graph 300 according to the remoteness of the particular network nodes 610 that originally received detected events 110 corresponding to points 360. Referring back to FIG. 8, network node 610q and network node 610r are directly connected to network node 610p via internal network 70. Accordingly, network nodes 610q and 610r are each one level removed from network node 610p. Network node 610s, however, is not directly connected to network node 610p but is directly connected to network node 610r. Network node 610s is therefore two levels removed from network node 610p.

An example illustrates certain embodiments of the present invention. Ruleset 152p in network node 610p may comprise a rule to dim by 50 percent those points 360 in global n-dimensional graph 300 that correspond to detected events 110 which were received from network 100 by any network node 610 that is two levels removed from network node 610. Ruleset 152p in network node 610p may also comprise a rule to dim by 25 percent those points 360 in global n-dimensional graph 300 that correspond to detected events 110 which were received from network 100 by any network node 610 that is one level removed from network node 610. In the present example, network node 610s is two levels removed from network node 610p. Based on ruleset 152p, correlation engine 140p in network node 610p may dim by 50 percent points 360s in global n-dimensional graph 300 that correspond to detected events 110s received from network 100 by network node 610s. In the present example, network nodes 610q and 610r are one level removed from network node 610p. Based on the rules in ruleset 152p, correlation engine 140p in network node 610p may dim by 25 percent points 360q and 360r in global n-dimensional graph 300 that correspond to detected events 110q and 110r received from network 100 by network nodes 610q and 610r.

According to certain embodiments, correlation engine 140 may generate alerts upon detecting a suspicious cluster 310 or pattern of points 360 in global n-dimensional graph 300. The severity of the alert may depend upon the visibility of points 360 in cluster 310 or pattern of points 360 in global n-dimensional graph 300. Referring to the preceding example, ruleset 152p in network node 610p may include a rule to generate an alert of high severity if all of points 360 in cluster 310 in global n-dimensional graph 300 have a visibility between 75 percent and 100 percent. Ruleset 152 may also include a rule to generate an alert of medium severity if all of points 360 in cluster 310 in global n-dimensional graph 300 have a visibility between 100 percent and 50 percent. Referring to FIG. 9, three points 360s in cluster 310 in global n-dimensional graph 300 correspond to detected events 110s received from network 100 by network node 610s. Network node 610s is two levels removed from network node 610p. Based on ruleset 152p, correlation engine 140p dims points 360s in global n-dimensional graph 300 by 50 percent. Two points 360q in cluster 310 correspond to detected events 110q received from network 100 by network node 610q. Because network nodes 610q is one level removed from network node 610p, correlation engine 140p dims points 360q in global n-dimensional graph 300 by 25 percent. Accordingly points 360q have a visibility of 75 percent. Two points 360r in cluster 310 correspond to detected events 110r received from network 100 by network node 610r. Because network nodes 610r is one level removed from network node 610p, correlation engine 140p dims points 360r in global n-dimensional graph 300 by 25 percent. Accordingly points 360r also have a visibility of 75 percent. Thus, in the present example, points 360 in cluster 310 in global n-dimensional graph 300 have a visibility between 50 percent and 100 percent. Accordingly, correlation engine 140p in network node 610p generates an alert of medium severity. According to certain embodiments, operator 60p is able to analyze the severity of a threat based on the severity of an alert. In particular, operator 60p may be most concerned with network nodes 610 that are directly connected to network node 610p.

The present invention may be implemented in various enterprise computer networks. In particular, system 10 may be a military information system. Network nodes 610 in system 10 may represent wireless terminals carried by various platoons in the field of battle. Internal network 70 may represent radio wave links between network nodes 610. An attacker may be attacking network nodes 610 of a first and second platoon. In the present example, network node 610p corresponding to the first platoon receives detected events 110p. Correlation engine 140p in network node 610p assigns attribute values 420 to detected events 110p. Correlation engine 140p stores detected events 110p in detected event storage 158p in memory module 150p. Correlation engine 140p also generates n-dimensional graph 340p comprising points 360p defined by attribute values 420 assigned to detected events 110p by correlation engine 140p. Correlation engine 140p stores n-dimensional graph 340p in memory module 150p.

In the present example, network node 610q corresponding to the second platoon receives detected events 110q. Correlation engine 140q in network node 610q assigns attribute values 420 to detected events 110q. Correlation engine 140q stores detected events 110q in detected event storage 158q in memory module 150q. Correlation engine 140q generates n-dimensional graph 340q comprising points 360q defined by attribute values 420 assigned to detected events 110q by correlation engine 140q. Correlation engine 140q stores n-dimensional graph 340q in memory module 150q in network node 610q.

Operator 60p of network node 610p establishes a radio wave link between network node 610p and network node 610q. In order to obtain a more complete view of the state of system 10, operator 60p sends graph request 380 to network node 610q. In response, network node 610q sends n-dimensional graph 340q to network node 610p. Correlation engine 140p in network node 610p combines n-dimensional graph 340 and n-dimensional graph 340q into global n-dimensional graph 300. Global n-dimensional graph 300 comprises points 360 corresponding to detected events 110p and detected events 110q.

In the present example, correlation engine 140p in network node 610p processes global n-dimensional graph 300 to detect attacks or potential attacks spread among network nodes 610. In the present example, correlation engine 140p detects cluster 310 of points 360 in global n-dimensional graph 300. Correlation engine 140p generates a corresponding alert. GUI 52p in network node 610p displays the alert corresponding to cluster 310 in global n-dimensional graph 300 to operator 60p. Operator 60p thus learns of the attack on both network node 610p and network node 610q.

The foregoing example illustrates a military information system that incorporates the present invention to detect an attack on a system and to correlate event information regarding the attack. The present invention may also be used to detect and correlate events other than attacks. For example, system 10 may be configured to detect and correlate information regarding supply levels of military units, movements of troops, maintenance of vehicles, conditions of weapons, or any other suitable type of event or information.

The present invention has several important technical advantages. Various embodiments of the invention may have none, some, or all of these advantages. One advantage is that the present invention enables intrusion detection system 10 to correlate detected events 110 received by multiple sensors 20 communicatively connected in a low bandwidth internal network 70. The present invention enables network nodes 610 to compress and transmit event information of detected events 110 as n-dimensional graphs 340 while preserving the usefulness of the event information for detecting attacks on the enterprise. In addition, the present invention reduces the amount of event information of detected events 110 that system 10 requires to be transmitted between network nodes 610.

Figure 10:
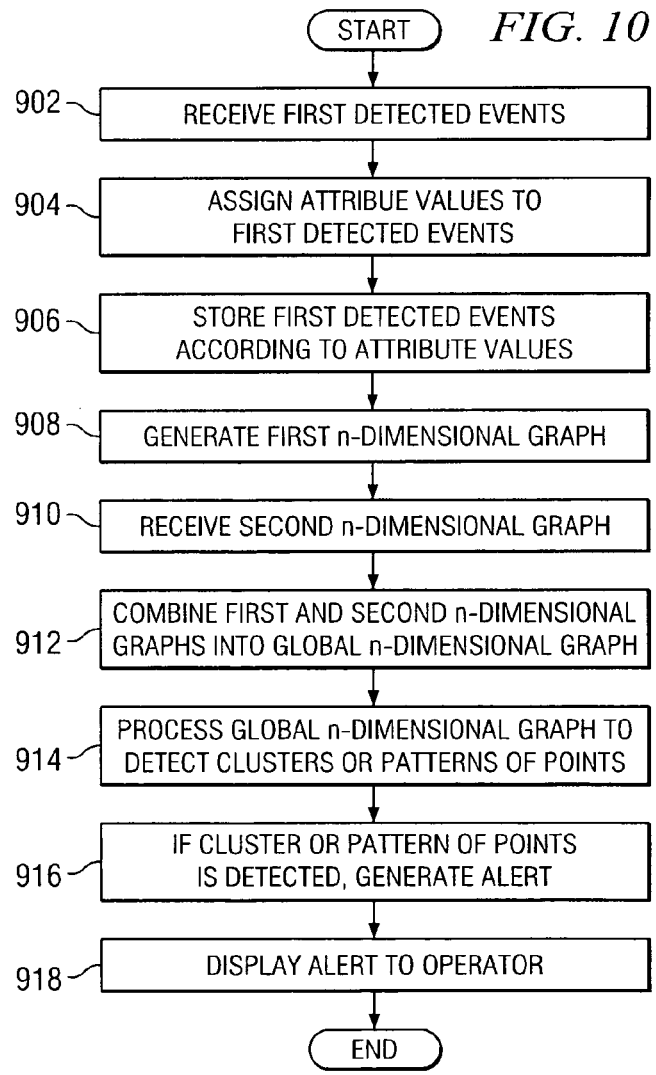
FIG. 10 illustrates a flow chart for correlating event information according to one embodiment of the present invention.

FIG. 10 illustrates a flow of operation according to a method of the present invention. At step 902, first network node 610p receives first detected events 110p from network 100. At step 904, correlation engine 140p in first network node 610p assigns attribute values 420 to first detected events 110p based on ruleset 152p. At step 906, correlation engine 140p in first network node 610p stores first detected events 110p in detected event storage 158p in accordance with attribute values 420 assigned by correlation engine 140p. At step 908, correlation engine 140p generates first n-dimensional graph 340p comprising points 360p defined by attribute values 420 assigned to first detected events 110p by correlation engine 140p. Correlation engine 140p stores first n-dimensional graph 340p in memory module 150p. At step 910, network node 610p receives second n-dimensional graph 340q comprising points 360q corresponding to second detected events 110q received by second network node 610q. At step 912, correlation engine 140p in first network node 610p combines first n-dimensional graph 340p and second n-dimensional graph 340q into global n-dimensional graph 300. Global n-dimensional graph 300 comprises points 360 corresponding to first detected events 110p and second detected events 110q. At step 914, correlation engine 140p in first network node 610p processes global n-dimensional graph 300 to detect clusters 310 or patterns signifying attacks or potential attacks spread among network nodes 610. At step 916, correlation engine 140p generates an alert upon detecting a cluster 310 or pattern in global n-dimensional graph 300 signifying an attack or potential attack. At step 918, GUI 52p in first network node 610p displays the alert corresponding to cluster 310 in global n-dimensional graph 300 to operator 60p.

Although the present invention has been described in detail, it should be understood that various changes, substitutions and alterations can be made hereto without departing from the scope of the invention as defined by the appended claims.

What is claimed is:

1. A method for security information management in a network, comprising:
   receiving event information for a plurality of events at a first network node, wherein the event information for a particular event comprises a plurality of attributes associated with the particular event;
   assigning a plurality of attribute values to each event, the attribute values of each event defining a point in n-dimensional space;
   generating a first n-dimensional graph comprising a plurality of points, the points corresponding to the events;
   receiving a second n-dimensional graph comprising a plurality of points, the second n-dimensional graph generated by a second network node;
   dimming the plurality of points in the second n-dimensional graph based at least in part on a distance between the first network node and the second network node, wherein:
      dimming the plurality of points in the second n-dimensional graph comprises reducing visibility of the plurality of points in the second n-dimensional graph by a percentage; and
      the percentage is based at least in part on the distance between the first network node and the second network node; and
   combining the first n-dimensional graph with the second n-dimensional graph to generate a third n-dimensional graph comprising points from each of the first n-dimensional graph and the second n-dimensional graph, the points of the third n-dimensional graph that are from the second n-dimensional graph being dimmed based at least in part on the distance between the first network node and the second network node.

2. The method of claim 1, wherein the plurality of attributes comprises a source Internet Protocol address and a destination Internet Protocol address.

3. The method of claim 2, wherein the first and second network nodes are communicatively linked by at least one bandwidth constrained network connection.

4. The method of claim 1, further comprising:
   sending the second n-dimensional graph from the second network node to the first network node; and
   identifying a state of the network based at least in part on the combination of the first and second n-dimensional graphs.

5. The method of claim 1, wherein generating a first n-dimensional graph comprises plotting each of the plurality of events in accordance with the attribute values assigned to that event.

6. The method of claim 1, wherein the first and second network nodes are wireless terminals communicatively coupled by a radio wave link.

7. The method of claim 1, further comprising generating an alert based at least in part on a cluster of points in the third n-dimensional graph, wherein:
   the alert has a medium severity if all points in the cluster have a visibility from 50 percent to 100 percent; and
   the alert has a high severity if all points in the cluster have a visibility from 75 percent to 100 percent.

8. The method of claim 1, further comprising:
   identifying at least one cluster of points in the combination of the first and second n-dimensional graphs; and
   displaying information associated with the points in the at least one cluster of points.

9. The method of claim 8, further comprising generating an alert based on the at least one cluster of points.

10. The method of claim 8, wherein the identification is performed using at least one Gaussian distribution function.

11. The method of claim 1, further comprising compressing at least one n-dimensional graph by means of lossy or lossless compression.

12. The method of claim 1, further comprising storing the first n-dimensional graph in a memory at a first network node and storing the second n-dimensional graph in a memory at a second network node.

13. The method of claim 1, wherein at least a portion of the events comprise alerts generated in a military information system.

14. The method of claim 1, wherein the event information is received by a plurality of sensors configured to receive data associated with potential attacks on at least one enterprise network.

15. A system for security information management in a network, comprising a first network node and a second network node, the first and second network nodes each comprising:
   at least one sensor configured to receive event information for a plurality of events, wherein the event information for a particular event comprises a plurality of attributes associated with the particular event; and
   a processor configured to:
      assign a plurality of attribute values to each event, the attribute values of each event defining a point in n-dimensional space;
      generate a first n-dimensional graph comprising a plurality of points, the points corresponding to the events;
      receive a second n-dimensional graph comprising a plurality of points;
      dim the plurality of points in the second n-dimensional graph based at least in part on a distance between the first network node and the second network node, wherein:
         dimming the plurality of points in the second n-dimensional graph comprises reducing visibility of the plurality of points in the second n-dimensional graph by a percentage; and
         the percentage is based at least in part on the distance between the first network node and the second network node; and
      combine the first n-dimensional graph with the second n-dimensional graph to generate a third n-dimensional graph comprising points from each of the first n-dimensional graph and the second n-dimensional graph, the points of the third n-dimensional graph that are from the second n-dimensional graph being dimmed based at least in part on the distance between the first network node and the second network node.

16. The system of claim 15, wherein the processor is configured to identify a state of the network based at least in part on the combination of the first and second n-dimensional graphs.

17. The system of claim 15, wherein the first and second network nodes are communicatively linked by at least one bandwidth constrained network connection.

18. The system of claim 15, wherein the processor is configured to generate the first n-dimensional graph by plotting a plurality of points, each point corresponding to the attribute values assigned to a particular event.

19. The system of claim 15, wherein:
the first and second network nodes each comprises a graphical user interface;
the processor is further configured to identify at least one cluster of points in the combination of the first and second n-dimensional graphs; and
the graphical user interface is configured to display information associated with the points in the at least one cluster of points.

20. The system of claim 19, wherein the processor is further configured to generate an alert based on the at least one cluster of points.

21. The system of claim 19, wherein the processor is configured to identify the at least one cluster of points using at least one Gaussian distribution function.

22. The system of claim 15, wherein the processor is configured to compress at least one n-dimensional graph by means of lossy or lossless compression.

23. The system of claim 15, further comprising a memory configured to store the first n-dimensional graph.

24. The system of claim 15, wherein at least a portion of the events comprise alerts generated in a military information system.

25. An apparatus for security information management in a network, comprising:
at least one sensor configured to receive, at a first network node, event information for a plurality of events, wherein the event information for a particular event comprises a plurality of attributes associated with the particular event; and
a processor configured to:
assign a plurality of attribute values to each event, the attribute values of each event defining a point in n-dimensional space;
generate a first n-dimensional graph comprising a plurality of points, the points corresponding to the events;
receive a second n-dimensional graph comprising a plurality of points, the second n-dimensional graph generated by a second network node;
dim the plurality of points in the second n-dimensional graph based at least in part on a distance between the first network node and the second network node, wherein:
dimming the plurality of points in the second n-dimensional graph comprises reducing visibility of the plurality of points in the second n-dimensional graph by a percentage; and
the percentage is based at least in part on the distance between the first network node and the second network node; and
combine the first n-dimensional graph with the second n-dimensional graph to generate a third n-dimensional graph comprising points from each of the first n-dimensional graph and the second n-dimensional graph, the points of the third n-dimensional graph that are from the second n-dimensional graph being dimmed based at least in part on the distance between the first network node and the second network node.

26. The apparatus of claim 25, wherein the processor is further configured to identify a state of the network based at least in part on the combination of the first and second n-dimensional graphs.

27. The apparatus of claim 25, wherein the processor is configured to send one or more n-dimensional graphs to one or more nodes of the network.

28. The apparatus of claim 25, further comprising one or more bandwidth constrained communication links from the apparatus to one or more nodes of the network.

29. The apparatus of claim 25, wherein the processor is configured to generate the first n-dimensional graph by plotting a plurality of points, each point corresponding to the attribute values assigned to a particular event.

30. The apparatus of claim 25, further comprising a graphical user interface and wherein:
the processor is configured to identify at least one cluster of points in the combination of the first and second n-dimensional graphs; and
the graphical user interface is configured to display information associated with the points in the at least one cluster of points.

31. The apparatus of claim 30, wherein the processor is further configured to generate an alert based at least in part on the at least one cluster of points.

32. The apparatus of claim 30, further comprising a memory and wherein:
the memory is configured to store at least one Gaussian distribution function; and
the processor is configured to identify the at least one cluster of points using the at least one Gaussian distribution function.

33. The apparatus of claim 25, wherein the processor is further configured to compress at least one n-dimensional graph by means of lossy or lossless compression.

34. The apparatus of claim 25, wherein at least a portion of the events comprise alerts generated in a military information system.

* * * * *